(12) United States Patent
Tofighbakhsh

(10) Patent No.: US 9,456,071 B2
(45) Date of Patent: Sep. 27, 2016

(54) EXTENSIBLE KERNEL FOR ADAPTIVE APPLICATION ENHANCEMENT

(71) Applicant: AT&T Intellectual Property I, L.P., Atlanta, GA (US)

(72) Inventor: Mostafa Tofighbakhsh, Cupertino, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 201 days.

(21) Appl. No.: 14/077,925

(22) Filed: Nov. 12, 2013

(65) Prior Publication Data
US 2015/0134809 A1 May 14, 2015

(51) Int. Cl.
G06F 15/173 (2006.01)
H04M 1/725 (2006.01)
G06F 21/00 (2013.01)
H04L 29/08 (2006.01)

(52) U.S. Cl.
CPC ............. H04M 1/725 (2013.01); G06F 21/00 (2013.01); H04L 69/321 (2013.01)

(58) Field of Classification Search
CPC .................................................. H04L 43/0876
USPC ......................................... 709/224; 713/164
See application file for complete search history.

(56) References Cited

U.S. PATENT DOCUMENTS

| 7,013,398 | B2 | 3/2006 | Zhao |
| 7,353,362 | B2 | 4/2008 | Georgiou et al. |
| 7,475,182 | B2 | 1/2009 | Matsuse et al. |
| 7,539,175 | B2 * | 5/2009 | White ................ H04L 12/5692 370/329 |

(Continued)

FOREIGN PATENT DOCUMENTS

| CA | 2547468 A1 | 5/2005 |
| CN | 102595650 A | 7/2012 |

(Continued)

OTHER PUBLICATIONS

Kellerer et al., "Cross-Layer Adaptation for Optimized B3G Service Provisioning," Proc. 6th International Symposium, 2003, 5 pages.

(Continued)

*Primary Examiner* — David Lazaro
*Assistant Examiner* — Marie Georges Henry
(74) *Attorney, Agent, or Firm* — Amin, Turocy & Watson, LLP

(57) ABSTRACT

Resource use by applications used by user equipment (UE) is adaptively controlled. A UE can comprise a modem-network kernel component that can be well partitioned from modem operations and can facilitate adaptively controlling use of functional blocks for applications of the UE, and enhancing use of network resources in connection with use of applications by the UE. The kernel component can operate in a protected area of the baseband and can utilize APIs and interfaces available to it by existing modem stacks and UE operating systems. The kernel component can interact with the communication network to adaptively present network enabler functions to other parts of the system. The kernel component can facilitate managing secure communication with the communication network to facilitate proper cross-layer optimization practices, including capabilities for compression and decompression, rate shaping, and event notification associated with the communication network and UE subsystems.

20 Claims, 13 Drawing Sheets

(56) References Cited

U.S. PATENT DOCUMENTS

| | | |
|---|---|---|
| 7,733,125 B2 | 6/2010 | Murotake |
| 7,818,163 B2 | 10/2010 | Lertora et al. |
| 7,836,444 B2 | 11/2010 | Kim |
| 7,940,778 B2 | 5/2011 | Ding et al. |
| 7,975,036 B2 | 7/2011 | Shyy et al. |
| 8,020,163 B2 | 9/2011 | Nollet et al. |
| 8,107,457 B2 | 1/2012 | White et al. |
| 8,189,612 B2 | 5/2012 | Lemaire et al. |
| 8,443,074 B2 | 5/2013 | Bahl et al. |
| 8,863,252 B1 | 10/2014 | Katzer et al. |
| 2003/0084229 A1 | 5/2003 | Ho et al. |
| 2004/0184470 A1 | 9/2004 | Holden |
| 2006/0015576 A1 | 1/2006 | Seo et al. |
| 2006/0041889 A1 | 2/2006 | Radulescu et al. |
| 2007/0261124 A1 | 11/2007 | Centonze et al. |
| 2008/0320499 A1* | 12/2008 | Suit .................... G06F 9/45533 719/323 |
| 2010/0061299 A1 | 3/2010 | Kennedy et al. |
| 2010/0165856 A1 | 7/2010 | Melpignano et al. |
| 2010/0199008 A1 | 8/2010 | Lee et al. |
| 2011/0125905 A1 | 5/2011 | Baucke et al. |
| 2011/0216753 A1 | 9/2011 | Kneckt et al. |
| 2012/0036581 A1* | 2/2012 | Maximilien ............ G06F 21/85 726/26 |
| 2012/0054771 A1* | 3/2012 | Krishnamurthy ..... G06F 9/4881 718/105 |
| 2012/0221884 A1 | 8/2012 | Carter et al. |
| 2012/0246370 A1 | 9/2012 | Zhang |
| 2012/0246641 A1 | 9/2012 | Gehrmann |
| 2012/0281716 A1 | 11/2012 | Vijayasankar et al. |
| 2012/0294152 A1 | 11/2012 | Yousefi'zadeh et al. |
| 2013/0111211 A1 | 5/2013 | Winslow et al. |
| 2013/0182601 A1 | 7/2013 | Bandyopadhyay et al. |
| 2013/0235721 A1 | 9/2013 | Nguyen et al. |
| 2013/0282951 A1 | 10/2013 | Kuo et al. |

FOREIGN PATENT DOCUMENTS

| | | |
|---|---|---|
| DE | 102007037064 A1 | 1/2009 |
| EP | 2015174 A1 | 1/2009 |
| EP | 2530989 A1 | 5/2012 |
| KR | 20060011560 | 2/2006 |
| KR | 100862918 B1 | 6/2008 |
| KR | 20090011845 A | 2/2009 |
| WO | 03028228 A2 | 4/2003 |
| WO | 2012074360 A1 | 6/2012 |

OTHER PUBLICATIONS

Kim et al., "Cross-Layer Design for Dynamic Resource Allocation in Wireless Networks," The MITRE Corporation, Aug. 2004, 9 pages.

Botek et al., "Summary of selected Cross-Layer Design Techniques proposed for wireless 3G and beyond networks (May 2010)," School of Electrical & Information Engineering, University of Sydney, Australia, 3 pages.

Gelenbe et al., "Self-aware networks and QoS," Proceedings of the IEEE, vol. 92, No. 9, Sep. 2004, 1478-1489.

Wu et al., "A Dynamic Call Admission Policy With Precision QoS Guarantee Using Stochastic Control for Mobile Wireless Networks," Proceedings of the IEEE, vol. 92, No. 9, Sep. 2004, 257-271.

Naguleswaran et al., "Cross-Layer Planning and Optimization for Military Applications," MiICIS2009, CANBERRA, Nov. 10-12, 2009, 1-5.

Office Action dated Dec. 18, 2014 for U.S. Appl. No. 14/077,981, 31 pages.

Office Action dated May 22, 2015 for U.S. Appl. No. 14/077,981, 25 pages.

Office Action dated Apr. 19, 2016 for U.S. Appl. No. 14/996,082, 23 pages.

* cited by examiner

EXTENSIBLE KERNEL FOR ADAPTIVE APPLICATION ENHANCEMENT

TECHNICAL FIELD

This disclosure relates generally to network communications and, more specifically, to an extensible kernel for adaptive application enhancement.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as, for example, universal mobile telecommunications system (UMTS), third generation partnership project (3GPP) long term evolution (LTE), high speed packet access (HSPA). These specifications and/or standards use different modulation techniques, such as code division multiple access (CDMA), time division multiple access (TDMA), frequency division multiple access (FDMA), multi-carrier CDMA (MC-CDMA), single-carrier CDMA (SC-CDMA), orthogonal frequency division multiple access (OFDMA), single-carrier frequency division multiple access (SC-FDMA), and so on.

Communication devices (e.g., wireless communication devices), such as mobile phones, electronic tablets, electronic gaming devices, and computers, are increasingly using applications to perform various functions and to communicate information between these communication devices and other communication devices (e.g., other mobile phones, electronic tablets, electronic gaming devices, computers, servers, etc.). An application can reside on a user's communication device, in a cloud, and/or on a server farm, for example.

The above-described description is merely intended to provide a contextual overview of wireless communication networks, and is not intended to be exhaustive.

DETAILED DESCRIPTION

Figure 1:
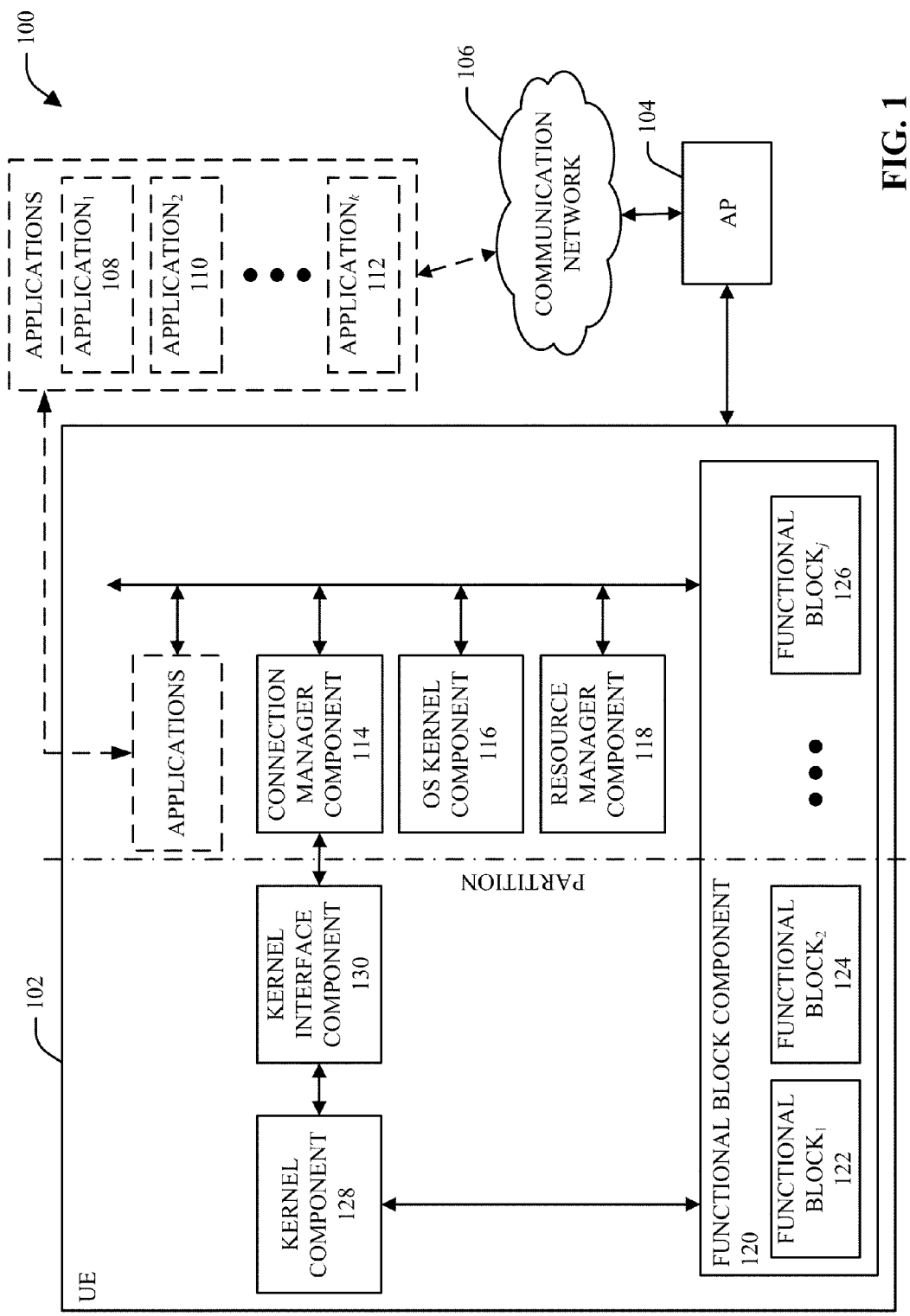
FIG. 1 illustrates a block diagram of an example system that can facilitate adaptively controlling resources (e.g., functional blocks) used for applications employed by communication devices in a communication network, in accordance with various aspects and embodiments described herein.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices (e.g., wireless communication devices), such as mobile phones, electronic tablets, electronic gaming devices, and computers, can be used to communicate voice and data information to other communication devices and/or to perform other desired functions (e.g., perform calculations, take photographs, play video or music content, play games, etc.). Communication devices also are increasingly using applications to perform various functions and to communicate information between these communication devices and other communication devices.

Over time, such communication devices have become more and more complex as more features have been added to communication devices. Some impediments to adding new features and capabilities to communication devices can be the expense and time used to add new features and capabilities to communication devices. Another issue associated with communication devices and applications can be harmonizing communication device and application behaviors for communication networks.

Techniques for adaptively controlling resources (e.g., functional blocks) of a communication device used by applications that are used by the communication device (e.g., user equipment (UE)) are presented herein. The communication device can comprise a kernel component (e.g., a modem-network kernel component) that can facilitate adaptively controlling applications and the UE, and enhancing use of network resources in connection with use of applications by the UE (e.g., by enabling dynamic communication-network optimization or enhancement practices). The kernel component can be or can comprise a dedicated kernel that can be well partitioned from modem operations and the kernel of the operating system. The kernel component can operate in a protected area of the base band and can utilize application programming interfaces (APIs) and interfaces available to the kernel component by existing modem stacks and UE operating systems. The kernel component also can provide interfaces, tools, and protocols that can be designed to add communication-network capabilities (e.g., add new communication-network capabilities), such as provided by the communication network (e.g., by network operators operating or associated with the communication network). These interfaces, tools, and protocols can facilitate communication-network enhancement (e.g., optimization) and quality of experience (QOE) practices.

The kernel component can interact with the communication network to adaptively present network enabler functions to other parts of the system. APIs, associated with and/or provided by the kernel component, can be tooled, designed, or structured to facilitate enabling applications to be network aware (e.g., aware of the communication network and its network conditions). Network agents and network clients on the communication device can interact with network policy servers (e.g., policy servers in or associated with the communication network) and network analytics to facilitate enabling applications to take advantage of dynamic policies and radio access network (RAN) optimization enabler functions associated with the communication network.

The kernel component also can facilitate managing secure communication with the communication network to facilitate proper cross-layer optimization practices. The cross-layer optimization practices can comprise, for example, capabilities for compression and decompression, rate shaping, and/or event notification associated with the communication network and UE subsystems, among other capabilities, such as disclosed herein.

Referring now to the drawings, FIG. 1 illustrates a block diagram of an example system 100 that can facilitate adaptively controlling resources (e.g., functional blocks) used for applications employed by communication devices (e.g., UEs) in a communication network, in accordance with various aspects and embodiments described herein. The system 100 can comprise a UE 102 (e.g., mobile and/or wireless communication device, such as a mobile phone (e.g., 3GPP universal mobile telecommunications system (UMTS) phone), electronic notebook, electronic pad or tablet, electronic gaming device, personal digital assistant (PDA), computer, set-top box, etc.) that can operate and communicate in a communication network environment. In an aspect, the UE 102 can be communicatively connected via a wireless communication connection(s) via an access point (AP) 104 to a communication network(s) 106.

In an aspect, as the UE 102 is moved through a wireless communication network environment, at various times, the UE 102 can be connected (e.g., wirelessly connected) to one of a plurality of APs (e.g., macro or cellular AP, femto AP, pico AP, wi-fi AP, wi-max AP, hotspot (e.g., hotspot 1.x, hotspot 2.x, where x is an integer number; UE 102 functioning as a mobile hotspot; etc.), etc.), such as an AP 104, that can operate in the wireless communication network environment. An AP (e.g., 104) can serve a specified coverage area to facilitate communication by the UE 102 or other UEs in the wireless communication network environment. The AP 104 can serve a respective coverage cell (e.g., macrocell, femtocell, picocell, etc.) that can cover a respective specified area, and the AP 104 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 104 and incoming voice and data traffic can be paged and routed to the UE 102 through the AP 104, and outgoing voice and data traffic from the UE 102 can be paged and routed through the AP 104 to other communication devices (e.g., another UE) in the communication network environment. In an aspect, the UE 102 can be connected and can communicate wirelessly using virtually any desired wireless technology, including, for example, cellular, wi-Fi, wi-Max, wireless local area networks (WLAN), etc.

At desired times, the UE 102 can utilize one or more applications, such as, for example, application$_1$ 108, application$_2$ 110, and/or (up through) application$_k$ 112, wherein k can be virtually any desired number. In accordance with various implementations, all or a portion of the applications (e.g., 108, 110, 112, etc.) can reside in the UE 102 and/or all or a portion of the applications (e.g., 108, 110, 112, etc.) can reside in another communication device(s) associated with the communication network 106. In some implementations, the communication network 106 can facilitate wireless connection with the UE 102 connected to the AP 104 and facilitate communication by or between a UE 102 and another UE(s) (not shown) or other type of communication device(s) (e.g., computer, server or server farm that can include an application server or content server that can be provide video content, audio content, and/or other content comprising other types of information, etc.) (not shown), wherein the communication device(s) can be associated with (e.g., communicatively connected to) the communication network 106 in the communication network environment.

In accordance with various implementations, all or a portion of the applications (e.g., 108, 110, 112, etc.) can reside in the UE 102 and/or all or a portion of the applications (e.g., 108, 110, 112, etc.) can reside in a remote communication device(s) associated with the communication network 106. An application (e.g., 108, 110, or 112) being used by the UE 102 can have functions that can be executed by the UE 102 and/or by the remote communication device associated with the application. An application (e.g., 108, 110, 112, etc.) can be, for example, a messaging application, a gaming application, a utility application, a financial application, a news application, a social networking application, a video application, a music application, an online shopping application, a mobile-to-mobile (M2M) type of application, a VoIP type of application, or a near real time (NRT) type of application, among other types of applications. In some implementations, the UE 102 can be connected (e.g., directly) with one or more applications (e.g., 108, 110, or 112) using, for example, one or more various types of wireless communication technology, such as near field communication (NFC) technology, bluetooth technology, zigBee technology, etc. In certain implementations, the UE 102 can function as a mobile hotspot (e.g., AP) to which one or more applications can be wirelessly connected to facilitate communication of traffic (e.g., voice or data traffic) between an application(s) and the communication network 106 via the UE 102. It is to be further appreciated and understood that one or more communication devices (e.g., remote communication device) can be located within a cloud, wherein, for example, the cloud can include a server farm comprising one or more servers (e.g., application servers) that can be utilized to perform respective application functions (e.g., VoIP, video streaming, messaging, multimedia, electronic gaming, news-related functions, social media functions, finance-related functions, etc.) based at least in part on the type of application.

The communication network 106 can include one or more wireline communication networks and one or more wireless communication networks, wherein the one or more wireless communication networks can be based on one or more various types of communication technology or protocols, such as, for example, 3G, 4G, or x generation (xG) network, where x can be virtually any desired integer or real value; wi-fi; etc. The communication network 106 (e.g., a core network, or a network comprising a core network and/or an IP-based network) can facilitate routing voice and data communications between a communication device(s) (e.g., UE 102) and other communication devices (e.g., remote communication device) associated with the communication network 106 in the communication network environment. The communication network 106 also can allocate resources to the UE 102 or other UEs in the communication network 106, convert or enforce protocols, establish and enforce quality of service (QOS) for the UEs (e.g., UE 102), provide applications or services in the communication network 106, translate signals, and/or perform other desired functions to facilitate system interoperability and communication in the communication network 106 (e.g., wireless portion of the communication network 106 or wireline portion of the communication network 106). The communication network 106 further can include desired components, such as routers, nodes, switches, interfaces, controllers, etc., that can facilitate communication of data between communication devices in the communication network environment.

The UE 102 can comprise a connection manager component 114 that can facilitate establishing connections between the UE 102 (and applications used by the UE 102) and the communication network 106 and/or another communication device associated with the communication network 106, controlling operation of the applications (e.g., 108, 110, 112, etc.), controlling operation of functional blocks (e.g., functional blocks comprising baseband functions), and/or performing other operations that can facilitate desired operation of the UE 102, as more fully disclosed herein.

The UE 102 also can comprise an operating-system (OS) kernel component 116 (e.g., rich OS kernel component) that can be employed to facilitate performing operations by the UE 102, including, for example, managing input/output data requests (e.g., from software and/or an application), translating requests into instructions (e.g., data processing instructions) for execution by a processor component or other component of the UE 102, etc. The OS kernel component 116 can be associated with (e.g., communicatively connected to) the connection manager component 114 (e.g., via a bus).

In some implementations, the UE 102 can comprise a resource manager component 118 that can facilitate managing certain resources (e.g., functional blocks comprising baseband functions) contained on the UE 102 and/or performing other desired operations in connection with such resources of the UE 102. The UE 102 also can comprise a functional block component 120 that can comprise a set of functional blocks (e.g., functional block sub-components), comprising functional block$_1$ 122, functional block$_2$ 124, and/or (up through) functional block$_j$ 126, wherein j can be virtually any desired number. The respective functional blocks (e.g., 122, 124, 126, etc.) can perform respective functions (e.g., baseband functions), such as, for example, data compression or decompression, data encryption or decryption, location detection, network-awareness functions (e.g., network-condition sensing (e.g., network-congestion sensing), power level sensing, etc.), etc. The set of functional blocks (e.g., 122, 124, 126, etc.) can be located on the system-on-chip (SOC) (e.g., can be at the SOC level), wherein the functional blocks can be of can comprise firmware or hardware, for example. The connection manager component 114 can have access to at least some of the control layers at the SOC, and can facilitate controlling operation of the functional blocks (e.g., 122, 124, 126, etc.) in the set of functional blocks.

To facilitate desirable operation (e.g., optimal, enhanced, favorable, etc., operation) of the UE 102, the UE 102 can comprise a kernel component 128 that that can be employed to facilitate performing certain operations by the UE 102, including, for example, managing certain input/output data requests (e.g., from software and/or an application), translating certain requests into instructions (e.g., data processing instructions) for execution by a processor component or other component (e.g., a functional block(s)) of the UE 102, etc. The kernel component 128 can be associated with (e.g., communicatively connected to) the connection manager component 114 via a kernel interface component 130 and a dedicated bus. The kernel component 128 also can be associated with at least a portion of the functional block component 120 (e.g., a portion of the functional blocks (e.g., functional block$_1$ 122, functional block$_2$ 124, and/or another functional block(s)) of the functional block component 120).

The kernel component 128 and/or the connection manager component 114 can operate to facilitate adaptively controlling certain resources (e.g., secure, embedded, and/or proprietary functional blocks) of the UE 102, for example, when using applications. The kernel component 128 and/or the connection manager component 114 also can facilitate adaptively controlling operation of the applications (e.g., 108, 110, 112, etc.) and the UE 102, and enhancing use of network resources of the communication network 106 in connection with use of applications by the UE 102 (e.g., by enabling dynamic communication-network optimization or enhancement practices), in accordance with defined communication enhancement criteria.

In some implementations, the kernel component 128 can be or can comprise a modem-network kernel component. The kernel component 128 also can be a dedicated kernel component (e.g., a dedicated kernel) that can be well partitioned from modem operations and the OS kernel component 116. The kernel component 128 can operate in a protected or secure area of the baseband and can utilize various APIs and interfaces available to the kernel component 128 by existing modem stacks and UE operating systems. The kernel interface component 130 and a first subset of the functional blocks (e.g., functional block$_1$ 122, functional block$_2$ 124, and/or another functional block(s)) of the functional block component 120 also can be well partitioned from other components (e.g., OS kernel component 116) of the UE 102. For instance, the kernel component 128 and the first subset of functional blocks can be partitioned or placed in a secure and trusted area of the UE 102 so that they cannot be visible to or accessed by certain applications (e.g., $3^{rd}$-party applications or other unauthorized applications), certain UE components (e.g., the OS kernel component 116), or other unauthorized entities (e.g., unauthorized and/or $3^{rd}$-party communication service providers) to facilitate securing the kernel component 128 and the first subset of functional blocks from being attacked, destroyed, or taken over by the certain unauthorized applications, unauthorized components, or other unauthorized entities.

The kernel component 128 can have direct access to certain modem functions and the first subset of functional blocks, wherein certain other components (e.g., OS kernel component 116) of the UE 102 that are outside the secure and trusted area of the UE 102 will not have access (e.g., direct access) to the first subset of functional blocks. In some implementations, a portion of memory resources (e.g., a dedicated memory (e.g., dedicated data store), or a partition in a shared memory), a portion of processing resources (e.g., a dedicated processor, or certain processing resources of a shared processor component), can be partitioned and placed in the secure and trusted area of the UE 102 with the kernel component 128, and the kernel component 128 can utilize such partitioned portion of the memory resources and/or processing resources.

The kernel component 128 also can provide interfaces, tools, and protocols that can be designed to add communication-network capabilities (e.g., add new communication-network capabilities), e.g., as provided by the communication network 106 (e.g., as provided by network operators operating or associated with the communication network 106) to facilitate desirably controlling resources (e.g., the first subset of functional blocks), applications (e.g., intelligent applications), or other components of the UE 102, in accordance with the defined communication enhancement criteria (e.g., in accordance with desired optimization practices). These interfaces, tools, and protocols can facilitate communication-network enhancement (e.g., optimization) and QOE practices.

The kernel component 128 also can interact with the communication network 106 to present (e.g., adaptively present) network enabler functions to other parts of the system 100. APIs, associated with and/or provided by the kernel component 128, can be tooled, designed, or structured to facilitate enabling applications (e.g., 108, 110, 112, etc.) to be network aware (e.g., aware of the communication network 106 and its network conditions). Network agents and network clients on the UE 102 can interact with network policy servers (e.g., policy servers in or associated with the communication network 106) and network analytics to facilitate enabling applications (e.g., 108, 110, 112, etc.) to take advantage of dynamic policies and RAN enabler functions (e.g., RAN optimization enabler functions) associated with the communication network 106.

The kernel component 128 also can facilitate managing secure communication with the communication network 106 to facilitate proper cross-layer practices (e.g., proper cross-layer optimization or enhancement practices). The cross-layer practices can comprise, for example, capabilities for compression and decompression, rate shaping, and/or event notification associated with the communication network 106 and UE subsystems, among other capabilities, such as disclosed herein. The kernel component 128 (e.g., dedicated kernel) can be at the baseband level, and can coexist and collaborate with other UE functions, including the operating system and the OS kernel component 116. In some implementations, the kernel component 128 can be common across all of the UEs, wherein the kernel component 128 can facilitate unifying the optimization practices among the various UE types.

In some implementations, the UE 102 also can comprise a second subset of functional blocks (e.g., functional block$_j$ 126 and/or another functional block(s) of the functional block component 120) that can be associated with the OS kernel component 116. The connection manager component 114, OS kernel component 116, and the second subset of functional blocks can be located in an open area of the UE 102 that can be outside of the secure and trusted area (e.g., zone) of the UE 102. In some implementations, the open area of the UE 102 also can have a desired level of security, wherein such desired level of security can be different from the security level of the secure or trusted area (e.g., the secure or trusted zone) of the UE 102.

Various other aspects and implementations of the kernel component 128 and connection manager component 114 will be described herein. In some implementations, the connection manager component 114 can monitor or track, and can collect information relating to, activity, behavior, and/or traffic flows (e.g., voice or data traffic flows) associated with the UE 102 and network-related conditions (e.g., network state information, network-related triggers, network-related controls, etc.) associated with the communication network 106. The connection manager component 114 can analyze the information relating to activity, behavior, and/or traffic flows (e.g., voice or data traffic flows) associated with the UE 102 and network-related conditions to generate analysis results. As part of the analysis, the connection manager component 114 can access and apply policy information (e.g., communication enhancement policy information), for example, obtained from a policy database (e.g., stored in a data store) of the UE 102. The policy information can be based at least in part on the defined communication enhancement criteria (e.g., which can be in accordance with desired optimization practices).

The connection manager component 114 and/or the kernel component 128 can facilitate controlling (e.g., adaptively controlling) the respective switching states of respective functional blocks (e.g., 122 and/or 124) of the first subset of functional blocks (e.g., functional block$_1$ 122, functional block$_2$ 124, and/or another functional block(s)) based at least in part on the analysis results, in accordance with the defined communication enhancement criteria. In some implementations, based at least in part on the analysis results, the connection manager component 114 can generate control instructions or switching recommendations that can facilitate desirably switching on or off respective functional blocks of the first subset of functional blocks to facilitate enhancing (e.g., optimizing, acceptably improving or augmenting, etc.) operation of the UE 102 and/or the communication network 106. The connection manager component 114 can communicate the control instructions or switching recommendations to the first subset of functional blocks (e.g., functional block$_1$ 122, functional block$_2$ 124, and/or another functional block(s)), or a portion thereof, via the kernel component 128 and the kernel interface component 130 to facilitate controlling the respective switching states of the respective functional blocks of the first subset of functional blocks. The kernel component 128 and/or the resource manager (e.g., a secure or trusted portion of the resource manager component 118, or a dedicated resource manager (not shown) that is located in the secure of trusted area of the UE 102) can process or execute the control instructions or switching recommendations and can switch on or switch off respective functional blocks of the first subset of functional blocks in response to the control instructions or switching recommendations.

In other implementations, based at least in part on the analysis results, the connection manager component 114 can update policy data in a policy database or table (e.g., stored in a data store of the UE 102), wherein the updated policy data can comprise information that can facilitate instructing or recommending that the kernel component 128 respectively switch on or switch off respective functional blocks of the first subset of functional blocks, in accordance with the defined communication enhancement criteria. The kernel component 128 can access or obtain the updated policy data from the policy database or table. The kernel component 128 can facilitate respectively switching on or switching off the respective functional blocks of the first subset of functional blocks based at least in part on the updated policy data.

In some aspects, the connection manager component can provide (e.g., expose, present, communicate, etc.) information regarding functional blocks (e.g., the secure or proprietary functional blocks) of the UE 102 to facilitate controlling (e.g., adaptively controlling) functional blocks used by an application(s) that is used by the UE 102. The connection manager component 114 can identify or determine the set of functional blocks of the functional block component 120 of the UE 102. From the set of functional blocks, the connection manager component 114 can identify or determine the first subset of functional blocks (e.g., associated with the secure or trusted area of the UE 102) and the second subset of functional blocks (e.g., associated with the open area of the UE 102).

The connection manager component 114 can facilitate providing (e.g., exposing, presenting, etc.) the information relating to (e.g., identifying) the first subset of functional blocks (e.g., functional block$_1$ 122, functional block$_2$ 124, and/or another functional block(s)) to the one or more applications (e.g., 108, 110, and/or 112, etc.) to facilitate notifying the one or more applications of the availability of the first subset of functional blocks on the UE 102. An application (e.g., application$_1$ 108) can analyze or evaluate the information relating to the first subset of functional blocks and/or other information, and can determine and/or select one or more of the functional blocks of the first subset of functional blocks to facilitate requesting that those one or more of the functional blocks of the first subset of functional blocks be turned on for use with the application. The application, or the component associated therewith, can generate, and send to the connection manager component 114, selection information that can indicate that the application is requesting that the one or more of the functional blocks of the first subset of functional blocks be turned on for use with the application.

The connection manager component 114 can receive the selection information from the application, or the component associated therewith. The connection manager component 114 can initialize (e.g., switch to the on state) the one or more functional blocks of the first subset of functional blocks based at least in part on (e.g., in response to) the selection information, in accordance with the defined communication enhancement criteria.

The connection manager component 114 can facilitate establishing a communication connection (e.g., facilitate establishing IP layer connectivity) between the application (e.g., 108) (and UE 102) and the communication network 106 to facilitate initiating a communication session associated with the application (e.g., 108), wherein the application (e.g., 108) can use the one or more functional blocks of the first subset of functional blocks during the communication session. The communication connection can be a 3G, 4G, or wi-fi communication connection, for example. The connection manager component 114 can receive or detect network-related information (e.g., network-level notifications, etc.) relating to the communication network 106. The connection manager component 114 can provide the network-related information and/or baseband-related information (e.g., baseband notifications associated with functional blocks) to the application and/or the user of the UE 102 to facilitate informing the application and/or the user of the network-related information and/or baseband-related information.

In some implementations, the connection manager component 114 and/or APIs associated with the kernel component 128 can monitor or track, and/or collect information relating to, activity, behavior, and/or traffic flows (e.g., voice or data traffic flows) associated with the UE 102 and network-related conditions (e.g., network state information, network-related triggers, network-related controls, etc.) associated with the communication network 106. The connection manager component 114 can update policy data (e.g., stored in a policy table or database in the data store of the UE 102) with network-related information received or detected from the communication network 106. The network-related information can comprise, for example, information relating to network-related communication conditions (e.g., network congestion level), network state information (e.g., network state change information), network-related triggers, and/or network-related controls, etc., associated with the communication network 106.

The connection manager component 114 can provide (e.g., expose, present, communicate, etc.) at least a portion of the policy data (e.g., updated policy data) to one or more applications associated with (e.g., utilized by) the UE 102. The connection manager component 114, and/or the application (e.g., 108) and/or the kernel component 128, can analyze the policy data, or a portion thereof, to facilitate determining whether a functional block(s) of the first subset of functional blocks is to be switched on or switched off (e.g., at a given time during the communication session). Based at least in part on the results of the analysis of the policy data, or portion thereof, the connection manager component 114, and/or the application (e.g., 108) and/or the kernel component 128, can determine an enhanced (e.g., optimized, favorable, most desirable, acceptable, etc.) operation condition in accordance with the defined communication enhancement criteria (e.g., in accordance with desired optimization practices). The enhanced operation condition can be associated with (e.g., mapped to) the switching on or switching off of respective functional blocks of the first subset of functional blocks, for example.

The connection manager component 114, and/or the kernel component 128, can provide (e.g., expose, present, communicate, etc.) information relating to the enhanced operation condition to the application (e.g., 108) and/or the user via the user's UE 102 to facilitate controlling the switching on or switching off of the respective functional blocks of the first subset of functional blocks (e.g., functional block$_1$ 122, functional block$_2$ 124, and/or another functional block(s)). The connection manager component can thereby facilitate controlling the respective switching of the respective functional blocks of the first subset of functional blocks (e.g., functional block$_1$ 122, functional block$_2$ 124, and/or another functional block(s)) based at least in part on the information relating to the enhanced operation condition. Based at least in part on (e.g., in response to receiving) the information relating to the enhanced operation condition, the kernel component 128, the resource manager (e.g., 118) and/or the respective functional blocks (e.g., functional block$_1$ 122, functional block$_2$ 124, and/or another functional block(s)), can facilitate respectively switching on or off the respective functional blocks of the first subset of functional blocks to facilitate desired operation of the UE 102, including the respective functional blocks, and the communication network 106 (e.g., in accordance with desired optimization practices).

The connection manager component 114 also can provide update information relating to the enhanced operation condition to the communication network 106 (e.g., the base station 104 and/or another component of the communication network 106 via the base station 104). The communication network 106 can use this information to facilitate implementing a desired network operational modification, if any, based at least in part on the enhanced operation condition employed by the UE 102, including the respective functional blocks of the first subset of functional blocks, to facilitate desired operation of the communication network 106, in accordance with the defined communication enhancement criteria (e.g., in accordance with desired optimization practices).

As an example of controlling the use of certain (e.g., secure, embedded, and/or proprietary) functional blocks, a user with the UE 102 may be moving from one location to another location. The UE 102 can initially have a two-dimensional (2-D) location-detection functional block (e.g., from the second subset of functional blocks) that can perform 2-D location detection for the UE 102. The UE 102 also can comprise a three-dimensional (3-D) location-detection functional block of the first subset of functional blocks that can perform 3-D location detection, wherein the 3-D location-detection functional block can be turned off at the initial time or initial location, based at least in part on network-related conditions or traffic flow conditions associated with the UE 102 at the initial time.

At a given point in time or at a given location, based at least on network-related information obtained or detected by the connection manager component 114 and/or an API(s), the connection manager component 114 can determine that a desired enhanced operation condition can be to switch on the 3-D location-detection functional block (and to switch off the 2-D location-detection functional block), in accordance with the defined enhancement communication criteria. The connection manager component 114 can update the policy data in the policy database or table to indicate that the desired enhanced operation condition can be to switch on the 3-D location-detection functional block (and to switch off the 2-D location-detection functional block), and/or the connection manager component 114 can communicate information indicating that the desired enhanced operation condition can be to switch on the 3-D location-detection functional block to the kernel component 128 and/or the application and/or the user. The kernel component 128 can access the policy data in the policy database or table, and/or can receive the information relating to the enhanced operation condition from the connection manager component 114. Based at least in part on the policy data or corresponding information, the kernel component 128 can facilitate switching on the 3-D location-detection functional block, wherein the 3-D location-detection functional block can perform 3-D location detection to facilitate determining, and providing information regarding, the 3-D location of the UE 102 for presentation by the UE 102.

At another time or location, the network-related information may indicate that the network is congested (e.g., has reached a defined level of congestion). Based at least in part on such network-related information, the connection manager component 114 can determine that the 3-D location-detection functional block is to be switched off to facilitate mitigating congestion in the communication network 106, in accordance with the defined enhancement communication criteria, as, e.g., the 3-D location-detection functional block can utilize more resources than the 2-D location-detection functional block or no location detection for the UE 102. The connection manager component 114 can update the policy data in the policy database or table to indicate that the desired updated enhanced operation condition can be to switch off the 3-D location-detection functional block (and to switch on the 2-D location-detection functional block), and/or the connection manager component 114 can communicate information indicating that the desired updated enhanced operation condition can be to switch off the 3-D location-detection functional block to the kernel component 128 and/or the application and/or the user. The kernel component 128 can access the policy data in the policy database or table, and/or can receive the information relating to the updated enhanced operation condition from the connection manager component 114. Based at least in part on the policy data or corresponding information, the kernel component 128 can facilitate switching off the 3-D location-detection functional block (and switching on the 2-D location-detection functional block, wherein the 2-D location-detection functional block can perform 2-D location detection to facilitate determining, and providing information regarding, the 2-D location of the UE 102 for presentation by the UE 102.

As another example of controlling the use of certain (e.g., secure, embedded, and/or proprietary) functional blocks, at a given time under certain network-related conditions or traffic flow conditions, the UE 102 can have a compression functional block switched on, wherein the compression functional block can be part of the first subset of functional blocks, and can perform various types of compression to facilitate compressing data being communicated by the UE 102. At the given time, the compression functional block can employ a first type (e.g., lower type) of compression technique that compresses the data traffic at a lower level than a second type (e.g., higher type) of compression technique, which can compress data traffic at a relatively higher level.

At a subsequent time, the network-related information may indicate that the network is congested (e.g., has reached a defined level of congestion). Based at least in part on such network-related information, the connection manager component 114 can determine that the compression functional block is to be switched from the first type of compression technique to the second type of compression technique to facilitate increasing the amount of data compression to facilitate mitigating congestion in the communication network 106, in accordance with the defined enhancement communication criteria. The connection manager component 114 can update the policy data in the policy database or table to indicate that the desired updated enhanced operation condition can be to switch or modify the compression functional block from the first type of compression technique to the second type of compression technique, and/or the connection manager component 114 can communicate, to the kernel component 128 and/or the application and/or the user, information indicating that the desired updated enhanced operation condition can be to switch or modify the compression functional block from the first type of compression technique to the second type of compression technique. The kernel component 128 can access the policy data in the policy database or table, and/or can receive the information relating to the updated enhanced operation condition from the connection manager component 114.

Based at least in part on the policy data or corresponding information, the kernel component 128 can facilitate switching or modifying the compression functional block from the first type of compression technique to the second type of compression technique.

Various aspects and embodiments of the disclosed subject matter can be employed to perform various tasks or achieve various desired performance. For instance, the disclosed subject matter, employing the kernel component 128 and its associated embedded functional blocks, and the connection manager component 114, can facilitate enhancing the QOE of the user by adaptively controlling settings (e.g., enhancement or optimization settings), for example, of the functional blocks of the first subset of functional blocks, in accordance with the defined communication enhancement criteria.

The disclosed subject matter, employing the kernel component 128 and its associated embedded functional blocks, and the connection manager component 114, can facilitate exposing contextual information relating to applications (e.g., 108, 110, and/or 112, etc.) and the communication network 106 and/or exposing certain algorithms aggregation of lower layer states as part of the disclosed cross-layer design to facilitate enabling or exploiting various features of the applications (e.g., intelligent applications). This can facilitate desirably (e.g., optimally, favorably, acceptably) controlling resources (e.g., embedded functional blocks of the first subset) to achieve desired (e.g., optimal, enhanced, favorable, acceptable) performance of the UE 102 and/or the communication network 106.

The disclosed subject matter, employing the kernel component 128 and its associated embedded functional blocks, and the connection manager component 114, also can enable adaptive UE behaviors as a function of, for example, radio access type, time of day, network traffic conditions, location of the UE 102 and associated user, etc. For instance, the connection manager component 114 and/or the kernel component 128 can operate, as more fully disclosed herein, to facilitate controlling the respective operation (e.g., the respective switching states or modes) of the functional blocks of the first subset of functional blocks, based at least in part on the radio access type, the time of data, network traffic conditions, and/or the location the UE 102 and user, etc., to facilitate desired (e.g., optimal, enhanced, favorable, acceptable) performance of the UE 102 and/or the communication network 106, in accordance with the defined communication enhancement criteria. As an example, during peak usage times of the day, the connection manager component 114 and/or the kernel component 128 can operate to adaptively control usage of the first subset of functional blocks to switch off or modify operation modes (e.g., to a lower resource usage mode) of certain functional blocks in the first subset to facilitate reducing congestion in the communication network. Whereas, during non-peak usage times of the day the connection manager component 114 and/or the kernel component 128 can operate to adaptively switch on or modify operation modes (e.g., to a higher resource usage mode) of certain functional blocks in the first subset to facilitate enhancing or maximizing the performance of the UE 102 or associated application(s) (e.g., 108, 110, and/or 112, etc.), e.g., while the communication network 106 has the resources available to accommodate the increased use of resources by the UE 102, in accordance with the defined communication enhancement criteria.

The disclosed subject matter, employing the kernel component 128 and its associated embedded functional blocks, and the connection manager component 114, also can facilitate implementing dynamic QOS controls, such as dynamic pricing, dynamic filtering rules (e.g., rules relating to data compression, data security, etc.), etc. Network congestion in a communication network can tend to be localized, and conventionally, enforcing fairness among the various areas of a communication network can be difficult and/or expensive. However, the connection manager component 114 and kernel component 128 of the UE 102 can facilitate operating to adaptively implement dynamic QOS controls based at least in part on the local network conditions in the communication network 106 associated with the UE 102, in accordance with the defined communication enhancement criteria.

The disclosed subject matter also can employ one or more embedded clients, e.g., at the firmware, wherein the one or more embedded clients can be immune from attack. For example, the functional blocks (e.g., clients) of the first subset of functional blocks can be embedded in the secure and trusted area of the UE 102 so that they cannot be visible to or accessed by certain applications (e.g., $3^{rd}$-party applications or other unauthorized applications), certain UE components (e.g., the OS kernel component 116), or other unauthorized entities (e.g., unauthorized and/or $3^{rd}$-party communication service providers) to facilitate securing the first subset of functional blocks from being attacked, destroyed, or taken over by the certain unauthorized applications, unauthorized components, or other unauthorized entities.

In accordance with the disclosed subject matter, the connection manager component 114 can manage (e.g., adaptively manage) data traffic volume or the length of connection time with the communication network 106 based at least in part on the time of day, type of service, data traffic type, and/or other factors, in accordance with the defined communication enhancement criteria. For example, the connection manager component 114 can manage data traffic volume associated with an application used by the UE 102, by adaptively controlling the respective operation (e.g., switching states or modes) of the respective functional blocks of the first subset of functional blocks, to allow a higher volume of data traffic for the application during a non-peak usage time of day for the communication network 106 and to limit the volume of data traffic for the application to a relatively lower volume during a peak usage time of day for the communication network 106 to facilitate mitigating network congestion during the peak usage time of day, in accordance with the defined communication enhancement criteria.

The disclosed subject matter, employing the kernel component 128 and its associated embedded functional blocks, and the connection manager component 114, can facilitate exposing sensors and network-aware components (e.g., accelerometers), through open APIs, to the kernel component 128, wherein such sensors and network-aware components typically are not available to the OS kernel component 116. The sensors or network-aware components can sense, detect, or obtain information, such as network-related information or traffic flow-related information, that can be used by the connection manager component 114 and/or kernel component 128 to facilitate adaptively controlling operation of the functional blocks of the first subset of functional blocks, in accordance with the defined communication enhancement criteria.

The kernel component 128 and/or the connection manager component 114 also can enable extended self-organizing network (eSON) functions to the UE 102. The kernel component 128 and/or the connection manager component 114 can use some of the information obtained from the sensors or network-aware components to facilitate enabling and utilizing eSON functions. Conventionally, self-organizing networks are typically limited to base stations and evolved packet cores, and does not include UEs. The disclosed subject matter can extend the sensors, network-aware components and controls, and can employ such extension to be complementary to the self-organizing network of the base stations and the communication network 106 (e.g., the core network of the communication network 106). The self-organizing network, comprising the base station 104, communication network 106, and UE 102, can employ eSON functions and adaptive control of the first subset of functional blocks to facilitate adaptively enhancing operation of the base station 104 and the communication network 106, controlling the power level associated with the communication network 106, etc. For example, the kernel component 128 and/or the connection manager component 114 can facilitate controlling operation (e.g., switching or modes) of the functional blocks of the first subset of functional blocks to facilitate enabling the communication network 106 and/or base station 104 to adaptively and desirably (e.g., optimally, favorably, acceptably) control operation of the communication network 106 and/or base station 104 (e.g., control power levels, control network congestion, etc.), in accordance with the defined communication enhancement criteria (e.g., in accordance with desired optimization practices). The extended functions of the UE 102, as part of the self-organizing network, can thereby facilitate enabling the communication network 106 and/or base station 104 to achieve their respective optimization objectives.

Accordingly, the kernel component 128 and/or the connection manager component 114 can employ the sensors, network-aware components, open APIs (e.g., traffic-load-aware API(s), network-congestion-aware API(s), etc.), etc., to facilitate preventatively and/or reactively controlling traffic flow and/or controlling network congestion associated with the communication network 106 (e.g., using suitable flow or congestion control methods or techniques). For example, the kernel component 128 and/or the connection manager component 114 can facilitate controlling operation of the functional blocks of the first subset of functional blocks to facilitate mitigating network congestion in the communication network 106. For instance, the kernel component 128 and/or the connection manager component 114 can facilitate controlling operation of a compression functional block to increase compression of the traffic flow and/or an interference-controller functional block to increase interference mitigation to facilitate controlling (e.g., mitigating, reducing) network congestion in the communication network 106, e.g., in response to a broadcast message obtained using an open API, wherein the broadcast message indicates that the communication network 106 has reached a defined threshold level of congestion for which congestion mitigation is desired.

The UE 102 also can employ a network-state notification API(s) and/or an application-state notification API(s) that, respectively, can facilitate enabling the kernel component 128 and/or the connection manager component 114 to obtain notifications comprising information relating to the state of the communication network 106 and/or notifications comprising information relating to the state of an application (e.g., 108). Based at least in part on the network-state notifications and/or the application-state notifications, the kernel component 128 and/or the connection manager component 114 can facilitate controlling operation of the functional blocks of the first subset of functional blocks to facilitate enhancing operation of the UE 102 and/or the communication network 106, in accordance with the defined communication enhancement criteria.

The UE 102 also can employ data-delivery-service APIs, such as a time-shift-data-delivery-service API, that can facilitate enabling the kernel component 128 and/or the connection manager component 114 to control the delivery of data to the UE 102. For example, in connection with a data delivery of content to the UE 102 via the communication network 106, wherein the delivery of the data is not time critical (e.g., data delivery does not have to be immediate), the kernel component 128 and/or the connection manager component 114 can employ the time-shift-data-delivery-service API to obtain information that can facilitate determining a desirable (e.g., suitable, favorable, optimal, acceptable) delivery time for delivery of the data to the UE 102, in accordance with the defined communication enhancement criteria. The kernel component 128 and/or the connection manager component 114 can facilitate adjusting the delivery time of the data delivery to have the data delivered to the UE 102 at the desired delivery time instead of the originally scheduled delivery time. This can facilitate mitigating network congestion in the communication network 106, as, for instance, data delivery of a large amount of data can be desirably scheduled to occur at a time when the communication network 106 is typically less congested than the originally scheduled time for delivery of the data.

In some implementations, the UE 102 can utilize a flow classification algorithm(s) that can facilitate classifying the type of data associated with a communication session involving the UE 102 (and an application (e.g., 108)). For instance, the connection manager component 114 can employ a flow classification algorithm to facilitate analyzing traffic flow during a communication session associated with an application used by the UE 102 to determine or classify the type of data (e.g., video content, audio content, voice data, textual data, etc.) in the traffic flow. Based at least in part on the type of data of the traffic flow, the connection manager component 114 can determine which functional blocks of the first subset of functional blocks are to be switched on or switched off, or are to have their operation modes changed, in accordance with the defined communication enhancement criteria. In accordance with the determination results, the connection manager component 114 can control operation of the functional blocks of the first subset of functional blocks to facilitate achieving desirable (e.g., enhanced, optimal, favorable, etc.) operation of the UE 102 and/or the communication network 106 (e.g., in accordance with the desired optimization practices).

The UE 102 also can perform short-term network congestion and resource enhancement (e.g., optimization) by employing a micro-shift method(s) or technique(s), longer-term network congestion and traffic load balancing by employing policy and macro-shift procedures and practices, enhancement (e.g., optimization) of signaling over traffic load via aggregation and opportunistic delivery of data, policy and charging engine management, and/or data delivery diversity triggers and events. For example, employing a micro-shift method(s) or technique(s), when the connection manager component 114 becomes aware of a network-congestion condition (e.g., via an API), as part of the cross-layer design of the disclosed subject matter, the connection manager component 114 can instruct the lower layers to buffer data of the traffic flow by a desired (e.g., defined or unspecified) amount of time (e.g., on the order of a millisecond, a microsecond, or other desired amount of time) to micro-shift the delivery of the data to or from the UE 102, e.g., until a specified condition occurs, by a random time delay, or by a coordinated time delay (e.g., a time delay as coordinated with the network 106).

Figure 2:
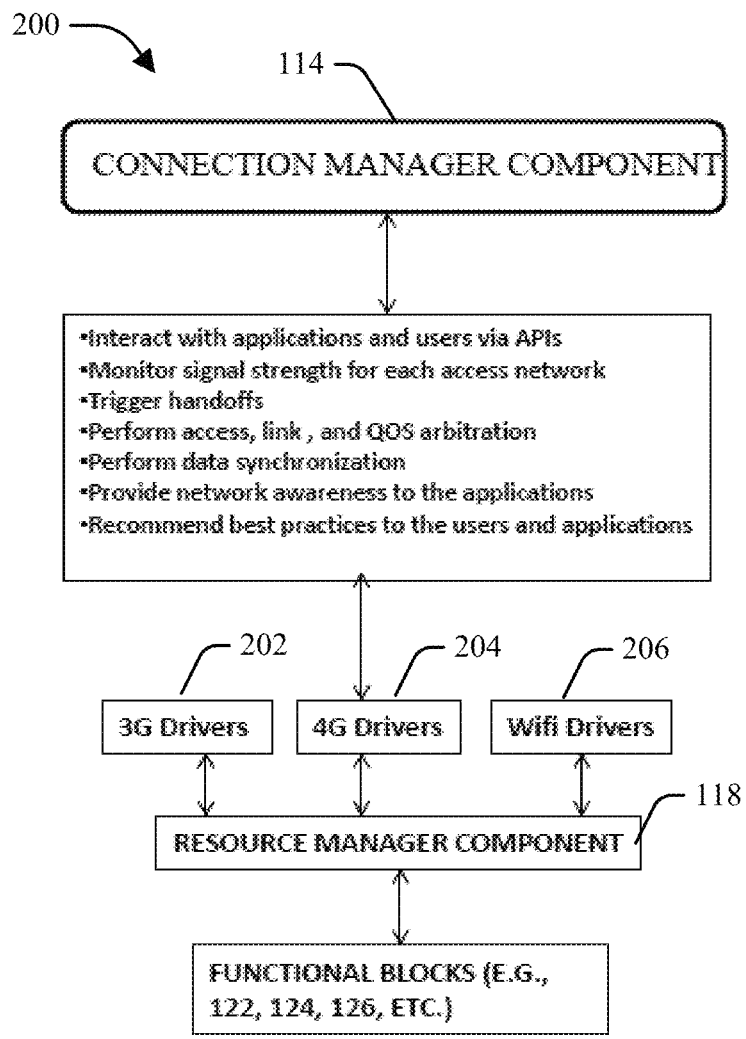
FIG. 2 depicts a block diagram of another example system that can employ a connection manager component to facilitate adaptively controlling resources (e.g., functional blocks) used for applications employed by communication devices in a communication network, in accordance with various aspects and embodiments described herein.

Referring briefly to FIG. 2 (along with FIG. 1), FIG. 2 depicts a diagram of an example system 200 that can employ a connection manager component 114 to facilitate adaptively controlling resources (e.g., functional blocks) used for applications employed by communication devices (e.g., UEs) in a communication network, in accordance with various aspects and embodiments described herein. The system 200 also can employ 3G, 4G, and wi-fi technology to facilitate voice and data communications, wherein 3G drivers 202, 4G drivers 204, and wi-fi drivers 206 can be used by the UE 102 to facilitate communicating voice or data via a 3G, 4G, or wi-fi wireless communication connection, respectively.

The system 200 also can comprise a resource manager component 118 (e.g., interconnect baseband manager) that can be associated with the 3G drivers 202, 4G drivers 204, wi-fi drivers 206, and connection manager component 114. The resource manager component 118 can facilitate controlling operation (e.g., controlling switching or operational modes) of the respective functional blocks (e.g., embedded baseband functions) of the set of functional blocks (functional block$_1$ 122, functional block$_2$ 124, functional block$_j$ 126, etc.) of the functional block component 120, as more fully disclosed herein.

In accordance with various aspects and implementations, the connection manager component 114 can perform a variety of functions based at least in part on the connection manager component 114 being aware of network-related information and/or traffic flow-related information and exposing such information to various APIs (e.g., which can be called to perform tasks) to facilitate performing the various functions. For instance, the connection manager component 114 can interact with applications (e.g., 108, 110, 112, etc.) and users of UEs (e.g., 102) via APIs, controls, components, etc. (e.g., network-aware APIs, controls, components, etc.), as more fully disclosed herein. The connection manager component 114 also can monitor the signal strength for each access network of the communication network 106 to facilitate determining whether or when to make a hand-off of the UE 102 from one access network to another access network and/or determining how the respective operations of the respective functional blocks are to be controlled, in accordance with the defined communication enhancement criteria. The connection manager component 114 also can facilitate triggering hand-offs of the UE 102 from one access network to another access network.

In some implementations, the connection manager component 114 can perform access arbitration to facilitate arbitrating between different access networks to facilitate determining which access network the UE 102 is to utilize, link arbitration to facilitate arbitrating between different communication links to facilitate determining which link the UE 102 is to use to communicate traffic, and/or QOS arbitration to facilitate arbitrating between different QOS requests associated with different traffic flows or applications to facilitate determining respective QOS parameters for the respective traffic flows or applications. The connection manager component 114 also can perform data synchronization to synchronize data being respectively communicated using respective applications (e.g., 108, 110, and/or 112, etc.) employed by the UE 102.

The connection manager component 114 also can provide network awareness to the applications (e.g., 108, 110, 112, etc.) by providing (e.g., presenting, exposing, communicating, etc.) network-related information and/or traffic flow-related information to the applications (e.g., 108, 110, 112, etc.), as more fully disclosed herein. The connection manager component 114 further determine and generate recommendations for enhanced operation conditions (e.g., in accordance with enhanced or optimized practices), and can provide such recommendations for enhanced operation conditions to the applications and/or users of the UEs, as more fully disclosed herein.

Figure 3:
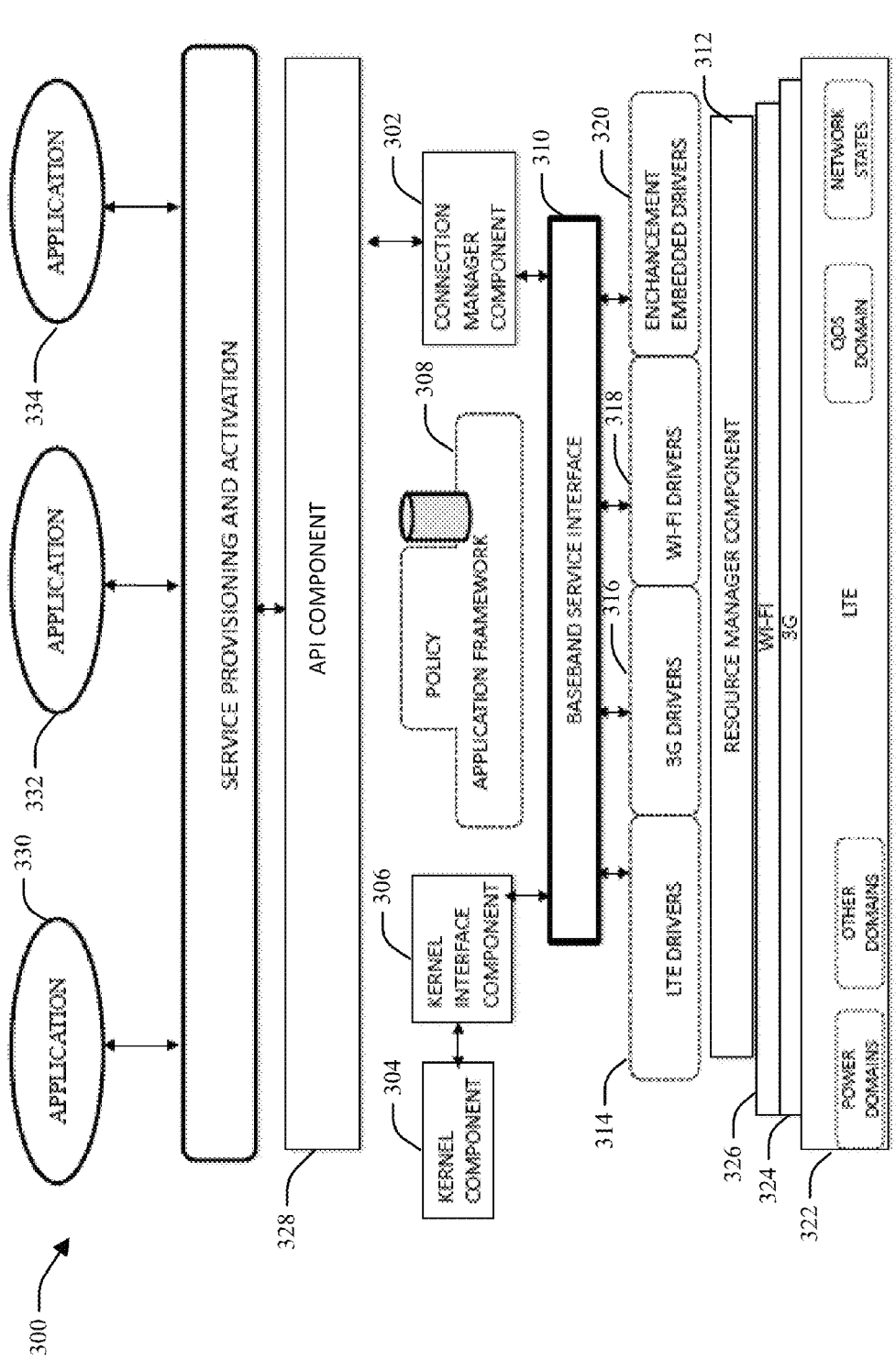
FIG. 3 illustrates a diagram of an example system that can facilitate adaptively controlling resources (e.g., functional blocks) used for applications employed by communication devices in a communication network, in accordance with various aspects and embodiments described herein.

FIG. 3 illustrates a diagram of an example system 300 that can facilitate adaptively controlling resources (e.g., functional blocks) used for applications employed by communication devices (e.g., UEs) in a communication network, in accordance with various aspects and embodiments described herein. The system 300 can be part of a UE, for example, to facilitate enhanced communications by the UE in a communication network. The system 300 can comprise a connection manager component 302 and kernel component 304 that can respectively perform various functions to facilitate adaptively controlling functional blocks, comprising secure and/or embedded functional blocks, to facilitate desired (e.g., enhanced, optimal, favorable, acceptable, etc.) operation of the UE and/or the communication network, as more fully disclosed herein.

The kernel component 304 can be associated with a kernel interface component 306, wherein the kernel component 304 and kernel interface component 306 can be well partitioned from other components (e.g., OS kernel component) of the UE and can be located in a secure and trusted area of the UE, as more fully disclosed herein. The system 300 also can comprise a policy application framework 308 that can be employed to store policy data and other information that can facilitate adaptively controlling operation of the functional blocks (e.g., embedded functional blocks) and/or other resources of the UE to facilitate desired operation of the UE and/or the communication network, as more fully disclosed herein. The policy data can comprise network-related data and/or traffic flow-related data, for example. The connection manager component 302 can update the policy data based in part on additional or new network-related data and/or traffic flow-related data received from various network-aware APIs, controls, components, etc.

The kernel component 304 can access the policy data maintained in the policy database or table stored in a data store of the policy application framework 308 via the kernel interface component 306. The kernel component 304 can facilitate controlling operation of the respective functional blocks (e.g., embedded functional blocks) based at least in part on the policy data.

The system 300 also can comprise a baseband service interface component 310 that can be associated with (e.g., communicatively connected to) the kernel component 304 (via the kernel interface component 306) and the connection manager component 302 to facilitate enabling the connection manager component 302 and kernel component 304 to access or interact with the resource manager component 312, long term evolution (LTE) drivers 314 (e.g., 4G drivers), 3G drivers 316, wi-fi drivers 318, and enhancement (e.g., optimization) embedded drivers 320. The resource manager component 312 can be associated with and can facilitate managing various resources, such as LTE resources 322, 3G resources 324, and wi-fi resources 326, wherein at least a portion of the resources can be functional blocks that can perform various types of functions (e.g., data compression, location detection, data encryption, etc.).

The connection manager component 302 can be associated with an API component 328 that can be or can comprise an application service interface, and can make available various APIs (e.g., open and/or network-aware APIs) that can be employed to facilitate obtaining network-related information and/or traffic flow-related information that can be used by the connection manager component 302 and/or kernel component 304 to facilitate controlling, and making determinations regarding, operation of functional blocks, such as the embedded functional blocks, as more fully disclosed herein.

The system 300 also can comprise a plurality of applications, such as application 330, application 332, and application 334, that can perform various functions or services (e.g., process data, present video or audio content, communicate or receive voice or data, etc.). The applications (e.g., 330, 332, 334, etc.) can be associated with a service provisioning and activation layer or component 336, which can be associated with the API component 328. Via the service provisioning and activation layer or component 336, the applications (e.g., 330, 332, 334, etc.) and/or UE user can be exposed to or can access network-related information and traffic flow-related information, such as the information obtained or derived by the APIs of the API component 328. The applications (e.g., 330, 332, 334, etc.) and/or UE user can review operation recommendations received from the connection manager component 302 and/or can make decisions or determinations regarding the operation of the application and/or functional blocks, as more fully disclosed herein.

In accordance with various implementations, the resource manager component 312 can facilitate exposing one or more APIs (e.g., network-aware APIs) associated with the API component 328 to an application (e.g., 330, 332, or 334). The one or more APIs can facilitate enabling the application to obtain information regarding the communication network (e.g., network conditions, states, notifications, events, triggers, etc.) and traffic flow (e.g., traffic flow-related conditions, states, notifications, events, triggers, etc.). The application can interact with the resources, such as the one or more functional blocks or other resources of the UE and/or can obtain or receive information relating to the one or more functional blocks or other resources (e.g., via a baseband module). For example, the application can select, interact, and handshake with the baseband module to facilitate determining which functional block(s) or other resource(s) are available to the application, determining which functional block(s) or other resource(s) to select, and/or determining desirable (e.g., optimal, best, acceptable, etc.) operation (e.g., desirable access, desirable time, desirable bandwidth, etc.) of the application and use of a functional block(s) or other resource(s) in connection with the application.

Based at least in part on the interaction and exchange of information with the application (e.g., 330, 332, or 334), the functional block (e.g., baseband function) or baseband module can facilitate communicating information (e.g., network-related information, traffic flow-related information, etc.) to the policy database stored in the data store of the policy application framework 308 to facilitate determining and/or providing desirable (e.g., optimal, best, acceptable, etc.) operation parameters for the application, functional block(s) employed by the application, and/or other resource(s) employed by the application. The application can determine, select, and/or obtain (e.g., retrieve) the desirable (e.g., optimal, best, acceptable, etc.) operation parameters for the application, functional block(s), and/or other resource(s) from the policy database of the policy application framework 308, in accordance with the defined communication enhancement criteria.

In accordance with the desired operational parameters, a communication connection can be established between the application (e.g., 330, 332, or 334) and the communication network. For example, network entry (e.g., standard network entry) procedures can be performed to facilitate establishing a communication connection and a bearer(s) between the application and the communication network.

In response to a successful connection being established between the application and the communication network, the connection manager component 302 can communicate one or more notifications to the application to facilitate desirable operation of the application, in accordance with the defined communication enhancement criteria. For example, the connection manager component 302 can receive notifications and/or other information from the communication network, and can communicate such notifications and/or other information, or data relating thereto, to the application. The one or more notifications can comprise, for example, a notification regarding the successful establishment of the connection between the application and the communication network, notifications relating to network events, notifications relating to network states, notifications relating to network congestion, notifications relating to network triggers, etc.

The application (e.g., 330, 332, or 334) can communication various operational data relating to operation of the application, including operation of the application in accordance with an enhanced operation condition, to the connection manager component 302, and the connection manager component 302 can facilitate updating the policy database of the policy application framework 308 based at least in part on the operational data received from the application. The application also can facilitate adapting its operations, and its use of functional blocks and other resources of the UE, based at least in part on network-related information and traffic flow-related information that the application can obtain or be made aware of via the one or more APIs of the API component 328, in accordance with the defined communication enhancement criteria.

Figure 4:
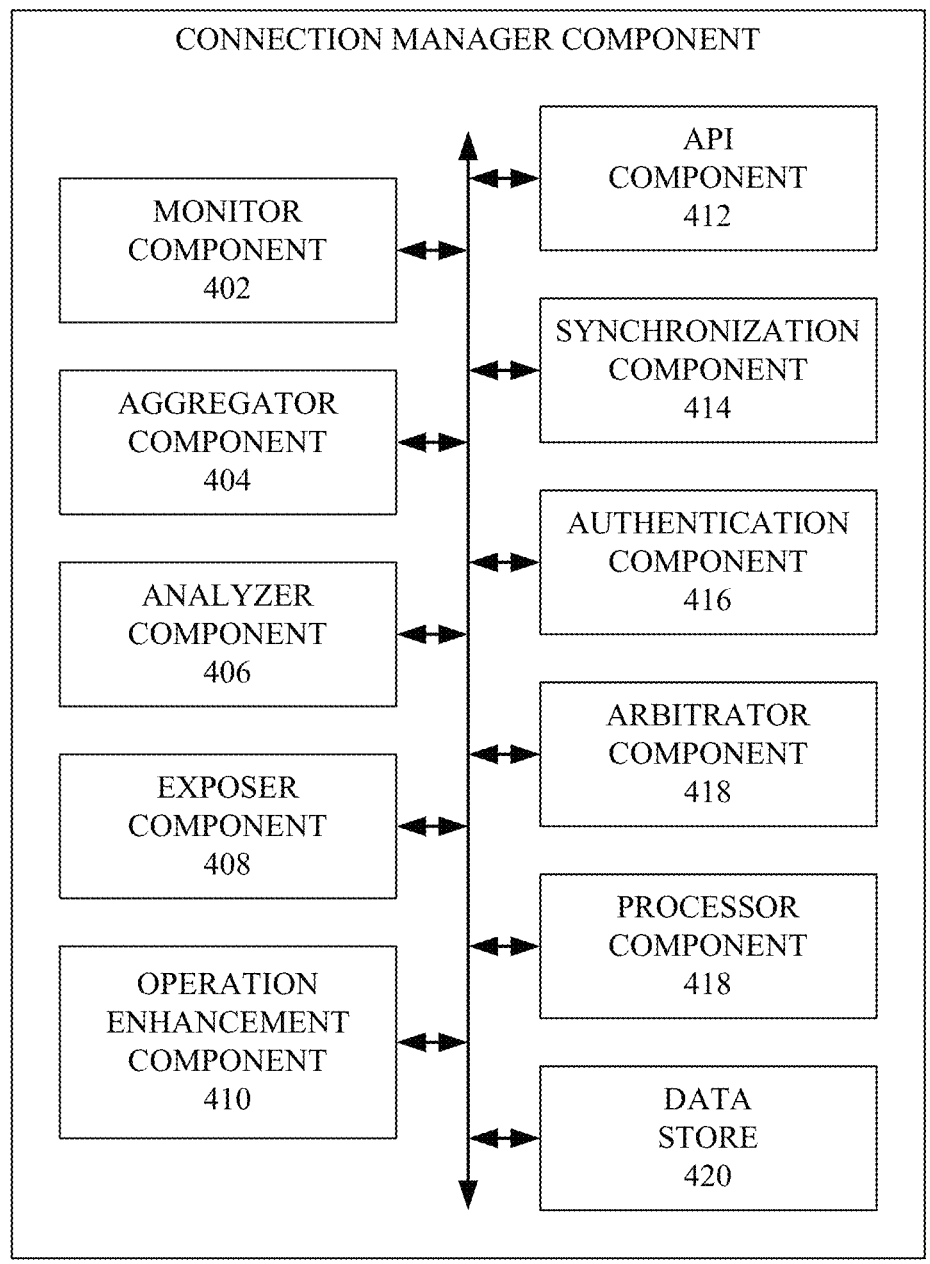
FIG. 4 depicts a block diagram of an example connection manager component in accordance with various aspects and embodiments of the disclosed subject matter.

FIG. 4 depicts a block diagram of an example connection manager component 400 in accordance with various aspects and embodiments of the disclosed subject matter. The connection manager component 400 can be employed by a UE to facilitate adaptively controlling operation of resources, such as functional blocks (e.g., embedded or secure functional blocks), of the UE, in accordance with various aspects and embodiments described herein.

The connection manager component 400 can comprise a monitor component 402 that can monitor or track activity, behavior, and/or traffic flows (e.g., voice or data traffic flows) associated with the UE. The monitor component 402 also can monitor or track network-related conditions (e.g., network state information, network-related triggers, network-related controls, etc.) associated with the communication network. The monitor component 402 can monitor or track signal strength for each access network of the communication network.

The connection manager component 400 can include an aggregator component 404 that can aggregate data received (e.g., obtained) from various entities (e.g., monitor component 402 or another component(s) of the connection manager component 400, communication network, application, a server or other communication device, processor, data store, etc.). The aggregator component 404 can correlate respective items of data based at least in part on type of data (e.g., video content, audio content, textual data, metadata, etc.), application to which the data relates, source of the data, time or date the data was generated or received, etc., to facilitate analyzing of the data by the analyzer component 406. For example, the aggregator component 404 can aggregate data relating to an application and/or other data (e.g., data relating to the communication network) to facilitate determining whether respective functional blocks (e.g., embedded or secure functional blocks) of a subset of functional blocks associated with the kernel component are to be enabled (e.g., switched to an on state) or disabled (e.g., switched to an off state) in connection with the application.

The connection manager component 400 can include the analyzer component 406, which can analyze data to facilitate determining whether respective functional blocks of a subset of functional blocks (e.g., associated with the kernel component) are to be enabled or disabled, generating a recommendation regarding the enabling or disabling of respective blocks in connection with an application, controlling the enabling and disabling of respective functional blocks, providing or exposing network-related information and traffic flow-related information to an application(s) or a user, etc., and can generate analysis results, based at least in part on the data analysis. For example, the analyzer component 406 can analyze information relating to network-related information and traffic flow-related information associated with the communication network and/or UE, and can generate analysis results that can facilitate determining whether respective functional blocks of a subset of functional blocks (e.g., associated with the kernel component) are to be enabled or disabled in connection with an application used by the UE.

The connection manager component 400 can include an exposer component 408 that can provide, present, or expose information to applications of the UE, a user of the UE, or various components of the UE. The exposer component 408 can provide, present, or expose information relating to various functional blocks (e.g., embedded or secure functional blocks) that are available on the UE (e.g., in the partitioned area of the UE via the kernel component) to applications of the UE and/or the UE user. The exposer component 408 also can provide, present, or expose network-related information (e.g., network conditions, network states, network-related notifications, network events, network triggers, etc.) and traffic flow-related information (e.g., traffic flow associated with the UE) to applications of the UE and/or the UE user.

The connection manager component 400 can comprise an operation enhancement component 410 that can facilitate determining whether respective functional blocks (e.g., embedded or secure functional blocks) of the subset of functional blocks associated with the kernel component are to be enabled or disabled in connection with the application, based at least in part on analysis results relating to an analysis of the network-related information and the traffic flow-related information, in accordance with the defined communication enhancement criteria. The operation enhancement component 410 can facilitate controlling (e.g., adaptively controlling) the operation (e.g., switching states or operational modes) of the functional blocks based at least in part on a determination regarding whether respective functional blocks of the subset of functional blocks associated with the kernel component are to be enabled or disabled. The operation enhancement component 410 can facilitate generating and sending, to the kernel component, instructions indicating respective switching states or operational modes that are to be used for respective functional blocks associated with the kernel component.

The operation enhancement component 410 also can generate an operation enhancement recommendation relating to an enhanced operation condition (e.g., a preferred enhanced operation condition), and can facilitate sending the operation enhancement recommendation to an application or UE user for consideration. The operation enhancement recommendation can specify desirable (e.g., preferred, optimal, enhanced, favorable, etc.) respective switching states or operational modes that can be used for respective functional blocks associated with the kernel component in connection with an application, in accordance with the defined communication enhancement criteria.

The connection manager component 400 also can comprise an API component 412 that can comprise one or more APIs (e.g., open or network-aware APIs) and/or can interact with one or more APIs that can facilitate obtaining network-related information and traffic flow-related information. The APIs associated with the API component 412 also can facilitate communicating or exposing the network-related information and traffic flow-related information to applications or users associated with the UE. For example, the API component 412 or another component of the connection manager component 400 can call or initialize an API associated with the API component 412 to facilitate having that API perform one or more functions that the API is configured to perform. The APIs can comprise, for example, a traffic-load-aware API(s), a network-congestion-aware API(s), a network-state notification API(s), an application-state notification API(s), a data-delivery-service API(s) (e.g., a time-shift-data-delivery-service API), and/or other network-aware APIs, among other APIs that can be employed by or interacted with by the API component 412.

The connection manager component 400 also can include a synchronization component 414 that can perform data synchronization to synchronize data being respectively communicated using respective applications employed by the UE. For example, the data synchronization can be performed with respect to data delivery in connection with an application, wherein the connection manager component 400 can facilitate scheduling data delivery (e.g., adjusting scheduling of data delivery, time-shifting data delivery (e.g., micro-shifting data delivery, macro-shifting data delivery)) to or from the UE in connection with an application.

The connection manager component 400 can comprise an authentication component 416 that can facilitate authenticating the kernel component of the UE, an application associated with the UE, a user associated with the UE, and/or other entities or components associated with the UE based at least in part on respective credentials of the kernel component, applications, UE users, or other entities or components associated with the UE. For instance, the authentication component 416 can perform authentication on the kernel component, UE user, and/or application to facilitate determining whether access to and use of the subset of functional blocks (e.g., embedded or secure functional blocks) associated with the kernel component is to be permitted or granted to the UE user or application. The authentication component 416 can request that the kernel component, UE user, or application provide authentication information (e.g., a valid authentication credential, a valid authentication or security token, etc.) that can indicate that the UE user or application is authorized to access and use the subset of functional blocks associated with the kernel component.

The authentication component 416 can analyze the received authentication information, and can compare such authentication information to stored authentication information (e.g., stored in the data store) to facilitate determining whether the received authentication information matches stored authentication information associated with (e.g., mapped to) the UE user or application. If the received authentication information matches the corresponding stored authentication information, the authentication component 416 can grant access rights to the UE user or application to use the subset of functional blocks, wherein the kernel component can be employed to facilitate controlling the switching states or operational modes of the functional blocks of the subset of functional blocks in connection with operation of the application. If the received authentication information matches the corresponding stored authentication information, the authentication component 416 can deny use of the subset of functional blocks to the UE user or application and/or the subset of functional blocks can remain invisible to the UE user, application, and/or other components of the UE in the open area of the UE.

Access or use rights to the subset of functional blocks associated with the kernel component can be limited to users or applications associated with a particular communication service provider, for example, wherein, if communication services are being provided to the UE via the particular communication service provider, the subset of functional blocks can be available for use by the UE, UE user, or application, and, if communication services are being provided to the UE via another communication service provider, the authentication component 416 can restrict or deny access to and use of the subset of functional blocks associated with the kernel component. For instance, the particular service provider can provide the kernel component with a token or other authentication information (e.g., a security token or other authentication credential), and the kernel component can provide that token to the connection manager component 400 (e.g., to the authentication component 416) to facilitate authenticating the UE user, application, and/or kernel component.

The connection manager component 400 can include an arbitrator component 418 that can arbitrate between respective features, between respective functions, between respective techniques, between QOSs, between respective links, etc. For example, the arbitrator component 418 can perform access arbitration to facilitate arbitrating between different access networks to facilitate determining which access network the UE is to utilize. The arbitrator component 418 can perform link arbitration to facilitate arbitrating between different communication links to facilitate determining which link the UE 102 is to use to communicate traffic. The arbitrator component 418 also can perform QOS arbitration to facilitate arbitrating between different QOS requests associated with different traffic flows or applications to facilitate determining respective QOS parameters for the respective traffic flows or applications.

The connection manager component 400 can comprise a processor component 420 that can work in conjunction with the other components (e.g., monitor component 402, aggregator component 404, analyzer component 406, etc.) to facilitate performing the various functions of the connection manager component 400. The processor component 420 can employ one or more processors, microprocessors, or controllers that can process data, such as information relating to applications, users, the communication network, traffic flows, APIs, functional blocks, determining whether to switch on or off or change operational modes of functional blocks, authentication, mappings, policies, defined communication enhancement criteria, algorithms, protocols, interfaces, tools, and/or other information, to facilitate operation of the connection manager component 400, as more fully disclosed herein, and control data flow between the connection manager component 400 and other components (e.g., communication network, base station, an application, a server or other communication device, a cloud, etc.) associated with the connection manager component 400.

The connection manager component 400 also can include a data store 422 that can store data structures (e.g., user data, metadata), code structure(s) (e.g., modules, objects, hashes, classes, procedures) or instructions, information relating to applications, users, the communication network, traffic flows, APIs, functional blocks, determining whether to switch on or off or change operational modes of functional blocks, authentication, mappings, policies, defined communication enhancement criteria, algorithms, protocols, interfaces, tools, and/or other information, to facilitate controlling operations associated with the connection manager component 400. In an aspect, the processor component 420 can be functionally coupled (e.g., through a memory bus) to the data store 422 in order to store and retrieve information desired to operate and/or confer functionality, at least in part, to the monitor component 402, aggregator component 404, analyzer component 406, etc., and/or substantially any other operational aspects of the connection manager component 400.

Figure 5:
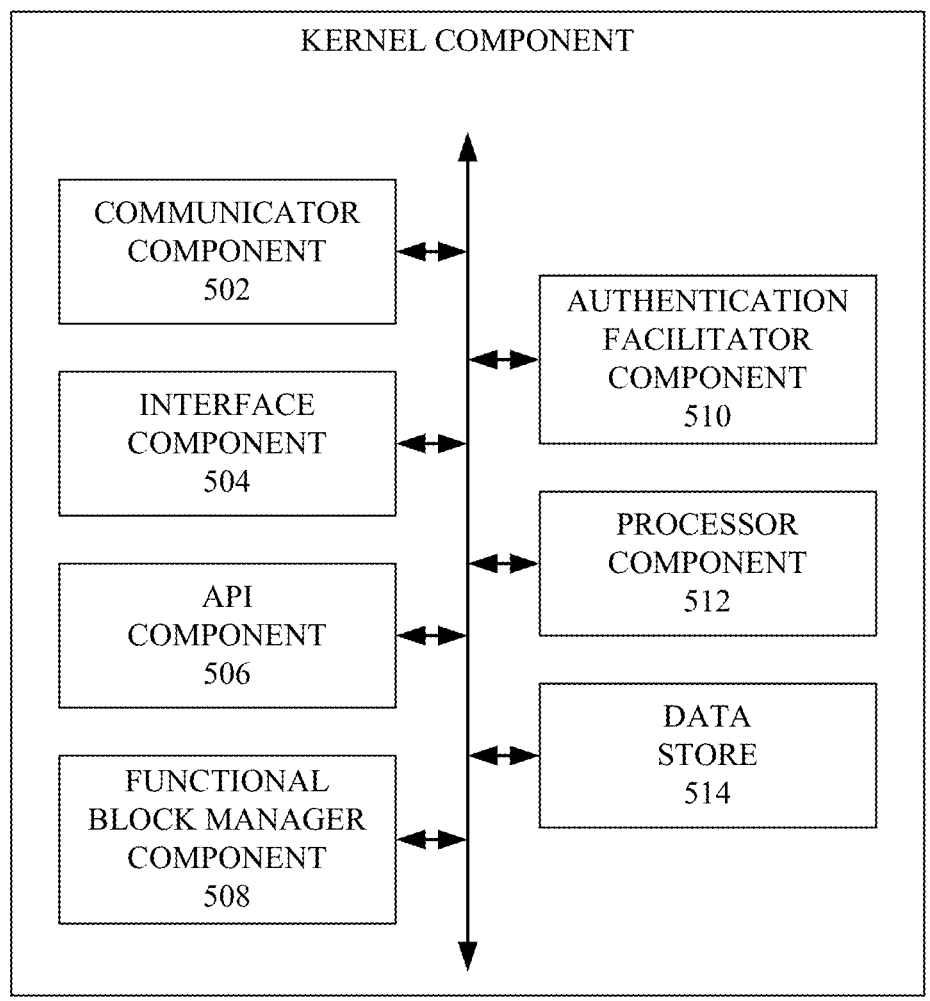
FIG. 5 presents a block diagram of an example kernel component in accordance with various aspects and embodiments of the disclosed subject matter.

FIG. 5 depicts a block diagram of an example kernel component 500 in accordance with various aspects and embodiments of the disclosed subject matter. The kernel component 500 can be employed by a UE to facilitate controlling (e.g., adaptively controlling) operation of resources, such as functional blocks (e.g., embedded or secure functional blocks) and modem functions, of the UE, in accordance with various aspects and embodiments described herein.

The kernel component 500 can comprise a communicator component 502 that can facilitate controlling communication of data between the functional blocks associated with the kernel component 500 and the connection manager component, applications, processor component, and/or data store, etc. The communicator component 502 also can facilitate controlling communication of data between dedicated memory associated with the kernel component 500 and the connection manager component, applications, processor component, and/or data store, etc. The communicator component 502 further can facilitate controlling communication of data between a dedicated processor component or dedicated processor resources associated with the kernel component 500 and the connection manager component, applications, processor component, and/or data store, etc. The communicator component 502 also can facilitate establishing secure communication between the kernel component 500 and the communication network to facilitate desired (e.g., proper, acceptable, enhanced, optimal, etc.) cross-layer enhancement or optimization practices, in accordance with the defined communication enhancement criteria, including practices or capabilities relating to, for example, compression and decompression of data, rate shaping, event notification to the communication and event notification from the communication network to UE subsystems or components of the UE.

The kernel component 500 also can comprise an interface component 504 that can facilitate providing various interfaces, tools, and/or protocols to, for example, the connection manager component, applications associated with the UE, and/or processor component, etc., to facilitate enabling the kernel component 500 and/or the other components perform various functions that can facilitate enhancing the operation of the UE and the communication network, including desirably and adaptively controlling operation of the functional blocks associated with the kernel component 500, in accordance with the defined communication enhancement criteria.

The kernel component 500 also can comprise an API component 506 that can comprise or can interact with various APIs (e.g., open or network-aware) APIs) that can perform various functions and can facilitate obtaining network-related information (e.g., network conditions, states, notifications, events, triggers, etc.) and traffic flow-related information (e.g., traffic flow-related conditions, states, notifications, events, triggers, etc.) associated with the communication network or UE. The APIs associated with the API component 506 can facilitate communicating or exposing the network-related information and traffic flow-related information to applications or users associated with the UE. For example, the API component 506 or another component of or associated with the kernel component 500 can call or initialize an API associated with the API component 506 to facilitate having that API perform one or more functions that the API is configured to perform. The APIs can comprise, for example, a traffic-load-aware API(s), a network-congestion-aware API(s), a network-state notification API(s), an application-state notification API(s), a data-delivery-service API(s) (e.g., a time-shift-data-delivery-service API), and/or other network-aware APIs, among other APIs that can be employed by or interacted with by the API component 506.

The kernel component 500 can comprise a functional block manager component 508 that can facilitate controlling operation of the respective functional blocks of a subset of functional blocks (e.g., embedded, secure, or proprietary) associated with the kernel component 500. For instance, the functional block manager component 508 can facilitate controlling the respective switching states (e.g., on state, off state) or operational modes (e.g., first type of operational mode, second type of operational mode, etc.) of the respective functional blocks of the subset of functional blocks, in accordance with the defined communication enhancement criteria. The various functional blocks can perform respective functions (e.g., data compression or decompression, location detection, data encryption or decryption, interference mitigation, etc.), such as more fully described herein.

In some implementations, the kernel component 500 can include an authentication facilitator component 510 that can comprise one or more tokens, such as authentication or security tokens, or authentication information that can facilitate controlling access to and use of the subset of functional blocks by applications and a UE user. For instance, the one or more tokens, or authentication information, can be employed to facilitate authenticating the kernel component 500, an application, or a UE user with the connection manager component of the UE to facilitate enabling access to and use of the functional blocks of the subset of functional blocks during operation of the UE (e.g., operation of an application associated with the UE) in the communication network. In certain implementations, access or use rights to the subset of functional blocks associated with the kernel component 500 can be limited to users or applications associated with a particular communication service provider, for example, wherein, if communication services are being provided to the UE via the particular communication service provider, the subset of functional blocks can be available for use by the UE, UE user, or application, and, if communication services are being provided to the UE via another communication service provider, access to and use of the subset of functional blocks associated with the kernel component 500 can be restricted or prohibited. For example, the particular service provider can provide the kernel component 500 with a token or other authentication information (e.g., a security token or other authentication credential), and the kernel component 500 can provide that token to the connection manager component to facilitate authenticating the UE user, application, and/or kernel component 500.

The kernel component 500 can comprise a processor component 512 that can work in conjunction with the other components (e.g., communicator component 502, interface component 504, API component 506, etc.) to facilitate performing the various functions of the kernel component 500. The processor component 512 can employ one or more processors, microprocessors, or controllers that can process data, such as information relating to applications, users, the communication network, traffic flows, APIs, functional blocks, determining whether to switch on or off or change operational modes of functional blocks, authentication, policies, defined communication enhancement criteria, algorithms, protocols, interfaces, tools, and/or other information, to facilitate operation of the kernel component 500, as more fully disclosed herein, and control data flow between the kernel component 500 and other components (e.g., connection manager component, kernel interface component, functional blocks, communication network, base station, an application, a server or other communication device, a cloud, etc.) associated with the kernel component 500.

The kernel component 500 also can include a data store 514 that can store data structures (e.g., user data, metadata), code structure(s) (e.g., modules, objects, hashes, classes, procedures) or instructions, information relating to applications, users, the communication network, traffic flows, APIs, functional blocks, determining whether to switch on or off or change operational modes of functional blocks, authentication, policies, defined communication enhancement criteria, algorithms, protocols, interfaces, tools, and/or other information, to facilitate controlling operations associated with the kernel component 500. In an aspect, the processor component 512 can be functionally coupled (e.g., through a memory bus) to the data store 514 in order to store and retrieve information desired to operate and/or confer functionality, at least in part, to the communicator component 502, interface component 504, API component 506, etc., and/or substantially any other operational aspects of the kernel component 500.

Figure 6:
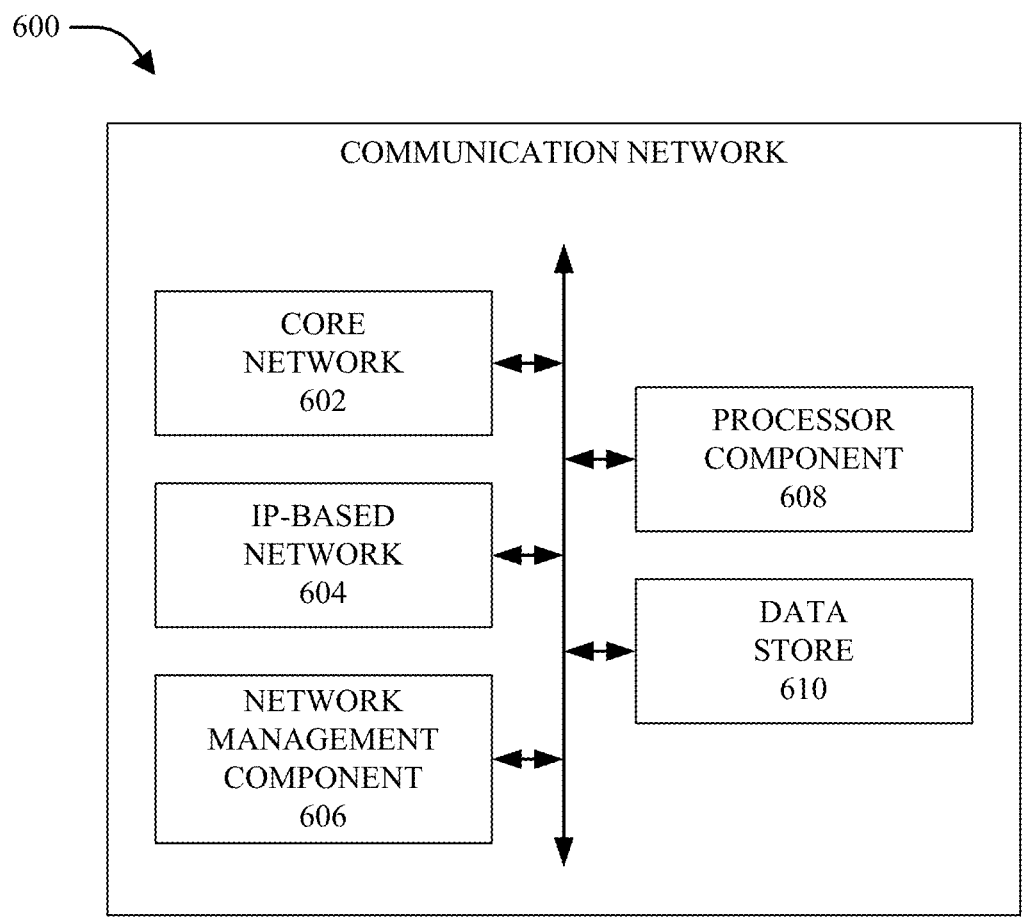
FIG. 6 illustrates a block diagram of an example communication network in accordance with various aspects and embodiments of the disclosed subject matter.

FIG. 6 illustrates a block diagram of an example communication network 600 in accordance with various aspects and embodiments of the disclosed subject matter. The communication network 600 can include a core network 602 (e.g., mobile core network) that can facilitate communications by UEs wirelessly connected to the communication network 600. A UE can be communicatively connected to the core network 602 via an AP (e.g., base station). The core network 602 can facilitate wireless communication of voice and data associated with communication devices, such as UEs, associated with the communication network 600. The core network 602 can facilitate routing voice and data communications between UEs and/or other communication devices (e.g., phone, computer, email server, multimedia server, audio server, video server, news server, financial or stock information server, other communication devices associated with an IP-based network 604 (e.g., the Internet), etc.) associated with the communication network 600. The core network 602 also can allocate resources to the UEs associated with the communication network 600 in the communication network environment, convert or enforce protocols, establish and enforce QoS for the UEs, provide applications or services in the network, translate signals, and/or perform other desired functions to facilitate system interoperability and communication in the wireless communication network. The core network 602 further can include desired components, such as routers, nodes (e.g., general packet radio service (GPRS) nodes, such as serving GPRS support node (SGSN), gateway GPRS support node (GGSN), etc.), switches, interfaces, controllers, etc., that can facilitate communication of data between communication devices associated with the communication network 600.

The communication network 600 can include the IP-based network 604, which can facilitate communications by communication devices (e.g., UEs) that are connected to the communication network 600 via a wireless connection, or a wireline or landline connection. For example, a UE can be communicatively connected to the IP-based network 604 via a wireless communication connection with the core network 602, wherein the UE can communicate with other communication devices connected to the communication network 600. A UE can transmit messages, use applications, access or download content, etc., via the core network 602 and/or the IP-based network 604, or another communication network (not shown).

The communication network 600 can contain a network management component 606 that can control operations and functions associated with the communication network 600. The network management component 606 also can track, and analyze information relating to, resource usage by the communication network 600, particularly the core network 602, in relation to servicing the UE or other UEs, resource usage by a UE associated with the communication network 600, wireless state transitions associated with the UE or other UEs, user behavior or activity, application behavior or activity, and/or other factors, to facilitate controlling operations and functions associated with the communication network 600. The network management component 606 also can facilitate presenting or making available information (e.g., network-related information, traffic flow-related information, etc.) relating to the communication network 600 to UEs associated with the communication network 600 to facilitate enhanced operation of the UEs and the communication network 600, in accordance with the defined communication enhancement criteria. The network management component 606 can facilitate applying communication enhancement rules (e.g., based on or corresponding to the defined communication enhancement criteria), protocols, and/or algorithms, to facilitate controlling and/or enhancing operation of the communication network 600.

The communication network 600 also can include a processor component 608 that can work in conjunction with (and/or be part of) the other components (e.g., core network 602, IP-based network 604, network management component 606, etc.) to facilitate performing the various functions of the communication network 600. The processor component 608 can employ one or more processors, microprocessors, or controllers that can process data, such as information relating to wireless or wireline communications; applications; users; network-related conditions, states, or events; traffic flow-related conditions, states, or events; network resources or functions; a mapping; and/or other information, to facilitate operation of the communication network 600, as more fully disclosed herein, and control data flow between the communication network 600 and other components (e.g., UE, base station, an application, a server or other communication device, a cloud, etc.) associated with the communication network 600.

The communication network 600 also can include a data store 610 that can store data structures (e.g., user data, metadata), code structure(s) (e.g., modules, objects, hashes, classes, procedures) or instructions, information relating to wireless or wireline communications; applications; users; network-related conditions, states, or events; traffic flow-related conditions, states, or events; network resources or functions; a mapping; and/or other information, to facilitate controlling operations associated with the communication network 600. In an aspect, the processor component 608 can be functionally coupled (e.g., through a memory bus) to the data store 610 in order to store and retrieve information desired to operate and/or confer functionality, at least in part, to the core network 602, IP-based network 604, network management component 606, etc., and/or substantially any other operational aspects of the communication network 600.

Figure 7:
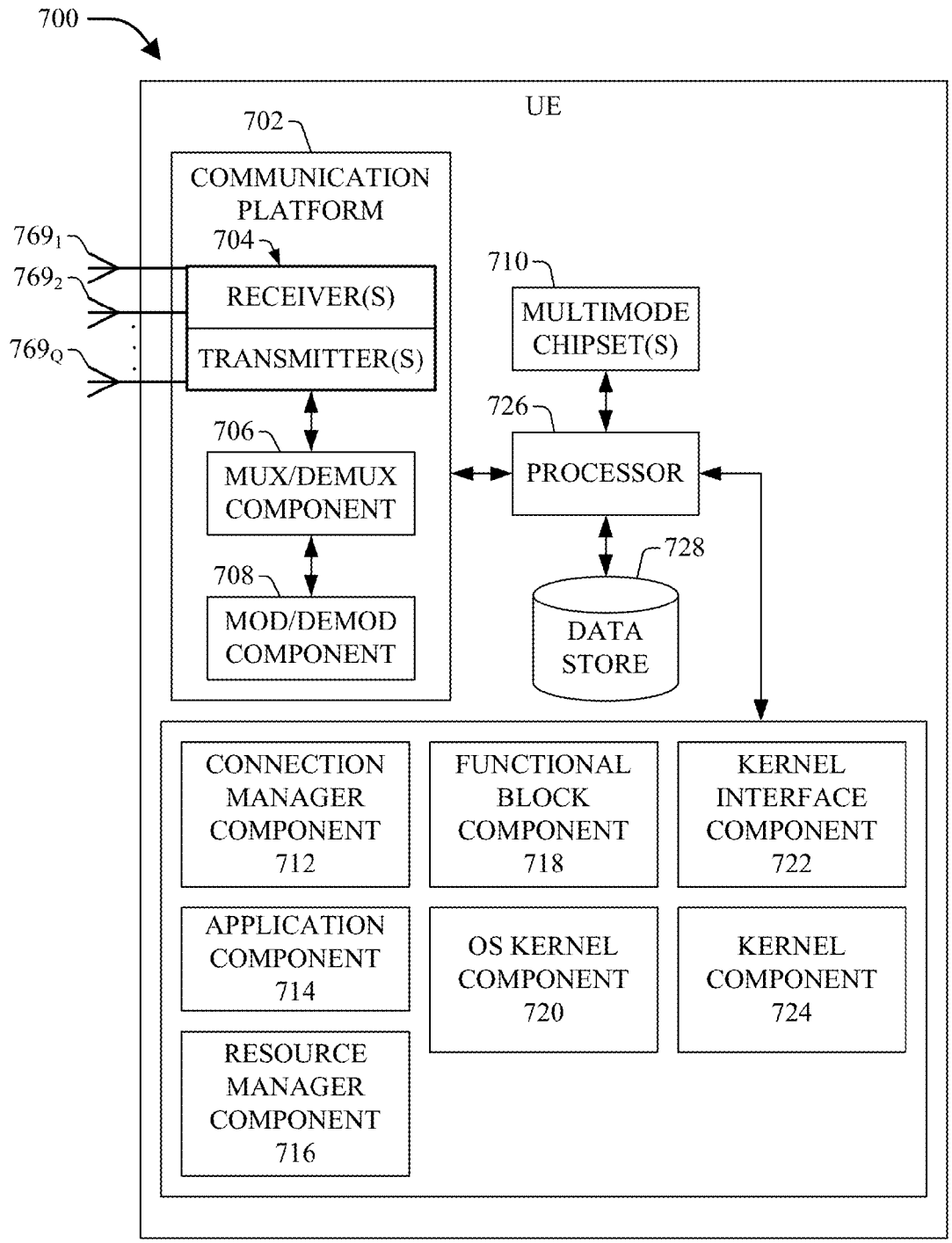
FIG. 7 depicts a block diagram of an example user equipment (UE) in accordance with an aspect of the disclosed subject matter.

FIG. 7 depicts a block diagram of an example UE 700 in accordance with an aspect of the disclosed subject matter. In an aspect, the UE 700 can be a multimode access terminal, wherein a set of antennas $769_1$-$769_Q$ (Q is a positive integer) can receive and transmit signal(s) from and to wireless devices like access points, access terminals, wireless ports and routers, and so forth, that operate in a radio access network. It should be appreciated that antennas $769_1$-$769_Q$ can be part of the communication platform 702, which can comprise electronic components and associated circuitry that can provide for processing and manipulation of received signal(s) and signal(s) to be transmitted, e.g., by receivers and transmitters 704, multiplexer/demultiplexer (mux/demux) component 706, and modulation/demodulation (mod/demod) component 708.

In another aspect, the UE 700 can include a multimode operation chipset(s) 710 that can allow the UE 700 to operate in multiple communication modes in accordance with disparate technical specification for wireless technologies. In an aspect, multimode operation chipset(s) 710 can utilize communication platform 702 in accordance with a specific mode of operation (e.g., voice, GPS). In another aspect, multimode operation chipset(s) 710 can be scheduled to operate concurrently (e.g., when Q>1) in various modes or within a multitask paradigm.

In accordance with various implementations, the UE 700 can comprise a connection manager component 712, an application component 714, a resource manager component 716, a functional block component 718 (e.g., comprising a first subset of functional blocks (e.g., embedded or secure functional blocks) and a second subset of functional blocks), an OS kernel component 720, a kernel interface component 722, and a kernel component 724 (e.g., well-partitioned and/or dedicated kernel component). The respective components (e.g., connection manager component 712, application component 714, resource manager component 716, functional block component 718, OS kernel component 720, kernel interface component 722, kernel component 724) can comprise the respective features and functions, such as more fully described herein.

The UE 700 also can include a processor(s) 726 that can be configured to confer functionality, at least in part, to substantially any electronic component within the UE 700, in accordance with aspects of the disclosed subject matter. The processor(s) 716 can facilitate enabling the UE 700 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. The processor(s) 726 also can facilitate enabling the UE 700 to process data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, functional blocks, determining whether to switch on or off or change operational modes of functional blocks, authentication, mappings, defined communication enhancement criteria, etc.

The UE 700 also can contain a data store 728 that can store data structures (e.g., user data, metadata); code structures (e.g., modules, objects, classes, procedures) or instructions; message hashes; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, functional blocks, determining whether to switch on or off or change operational modes of functional blocks, authentication, mappings, defined communication enhancement criteria, and/or other data; user policies; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; etc. In an aspect, the processor(s) 726 can be functionally coupled (e.g., through a memory bus) to the data store 728 in order to store and retrieve information (e.g., data structures; code structures; instructions; algorithms; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, functional blocks, determining whether to switch on or off or change operational modes of functional blocks, authentication, mappings, defined communication enhancement criteria, etc.) desired to operate and/or confer functionality, at least in part, to the communication platform 702, multimode operation chipset(s) 710, connection manager component 712, application component 714, resource manager component 716, functional block component 718, OS kernel component 720, kernel interface component 722, kernel component 724, and/or substantially any other operational aspects of the UE 700.

Figure 8:
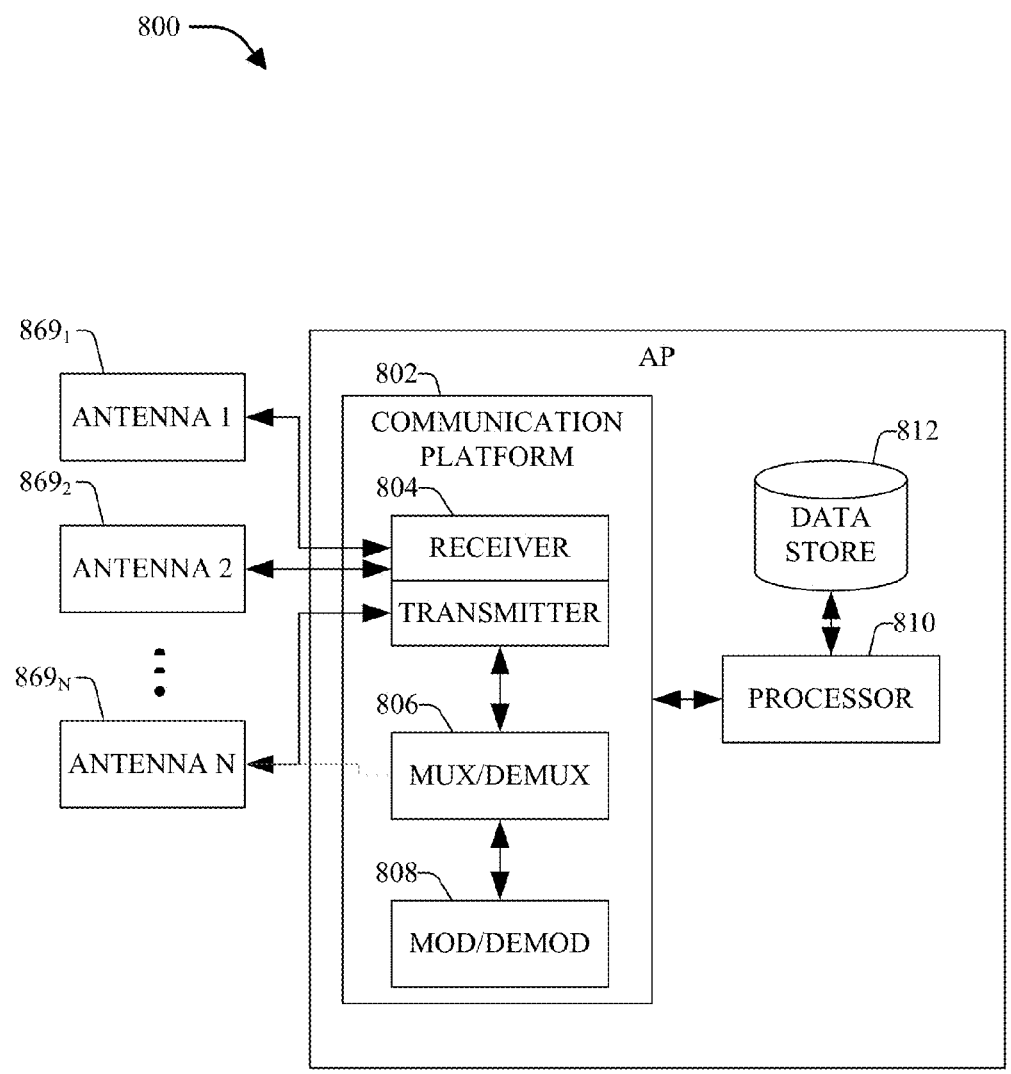
FIG. 8 illustrates a block diagram of an example access point in accordance with an aspect of the disclosed subject matter.

FIG. 8 illustrates a block diagram of an example AP 800 (e.g., femtocell, picocell, macro base station, etc.) in accordance with an aspect of the disclosed subject matter. The AP 800 can receive and transmit signal(s) from and to wireless devices like access points (e.g., femtocells, picocells, base stations, etc.), access terminals (e.g., UEs), wireless ports and routers, and the like, through a set of antennas $869_1$-$869_N$. In an aspect, the antennas $869_1$-$869_N$ are a part of a communication platform 802, which comprises electronic components and associated circuitry that can provide for processing and manipulation of received signal(s) and signal(s) to be transmitted. In an aspect, the communication platform 802 can include a receiver/transmitter 804 that can convert signal from analog to digital upon reception, and from digital to analog upon transmission. In addition, receiver/transmitter 804 can divide a single data stream into multiple, parallel data streams, or perform the reciprocal operation.

In an aspect, coupled to receiver/transmitter 804 can be a multiplexer/demultiplexer (mux/demux) 806 that can facilitate manipulation of signal in time and frequency space. The mux/demux 806 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 806 can scramble and spread information (e.g., codes) according to substantially any code known in the art, e.g., Hadamard-Walsh codes, Baker codes, Kasami codes, polyphase codes, and so on. A modulator/demodulator (mod/demod) 808 also can be part of the communication platform 802, and can modulate information according to multiple modulation techniques, such as frequency modulation, amplitude modulation (e.g., M-ary quadrature amplitude modulation (QAM), with M a positive integer), phase-shift keying (PSK), and the like.

The AP 800 also can comprise a processor(s) 810 that can be configured to confer and/or facilitate providing functionality, at least partially, to substantially any electronic component in or associated with the AP 800. For instance, the processor(s) 810 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc., to facilitate between an associated UE and the communication network.

In another aspect, the AP 800 can include a data store 812 that can store data structures; code instructions; rate coding information; information relating to measurement of radio link quality or reception of information related thereto; information relating to establishing a communications connection between a communication device (e.g., UE) and other communication devices; system or device information like policies and specifications; code sequences for scrambling; spreading and pilot transmission; floor plan configuration; access point deployment and frequency plans; scheduling policies; and so on. The processor(s) 810 can be coupled to the data store 812 in order to store and retrieve information (e.g., information relating to multiplexing/demultiplexing or modulation/demodulation, information relating to radio link levels, information relating to establishing communication connections associated with a UE(s) served by the AP 800, etc.) desired to operate and/or confer functionality to the communication platform 802, and/or other operational components of AP 800.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
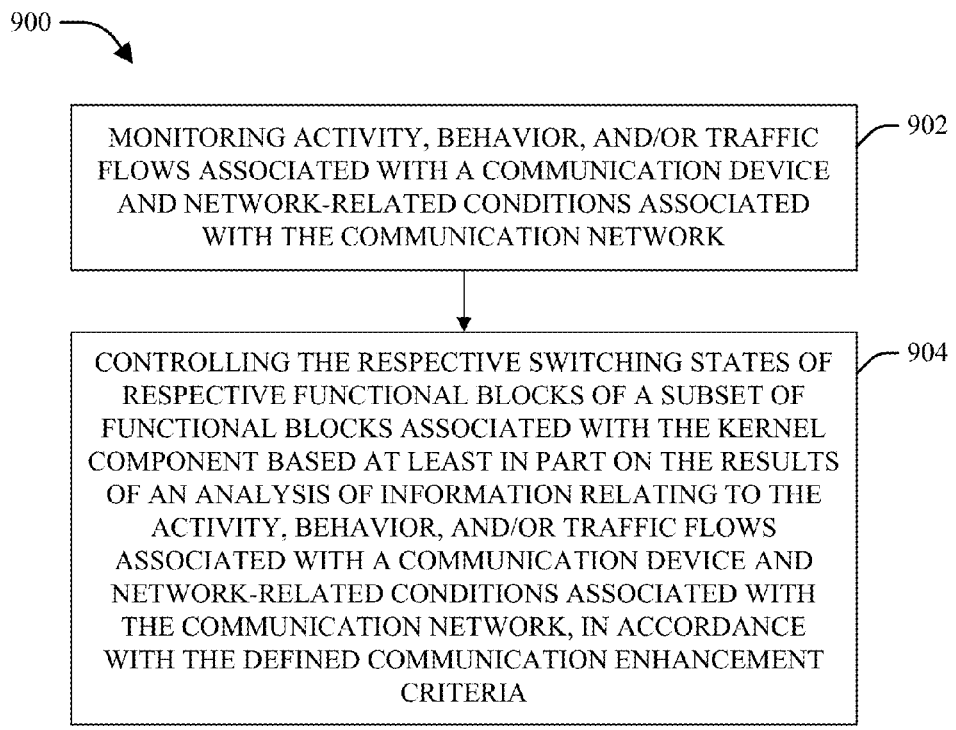
FIG. 9 illustrates a flow diagram of an example method that can facilitate controlling (e.g., adaptively controlling) functional blocks used by applications that are used by communication devices in a communication network, in accordance with various aspects and embodiments described herein.
Figure 10:
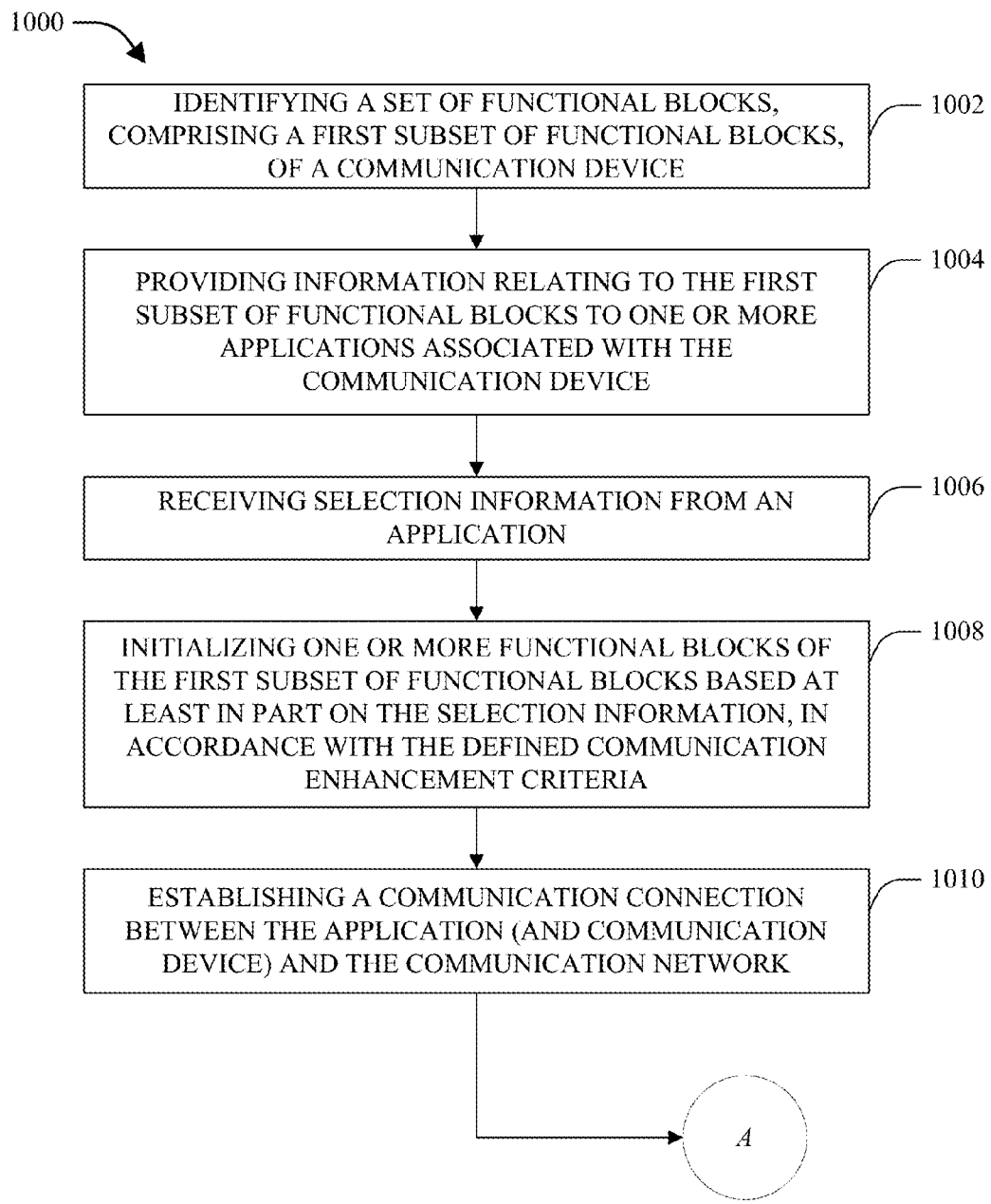
FIG. 10 depicts a flow diagram of an example method that can provide information regarding functional blocks of a communication device to facilitate controlling (e.g., adaptively controlling) functional blocks used by applications that are used by the communication device in a communication network, in accordance with various aspects and embodiments.
Figure 11:
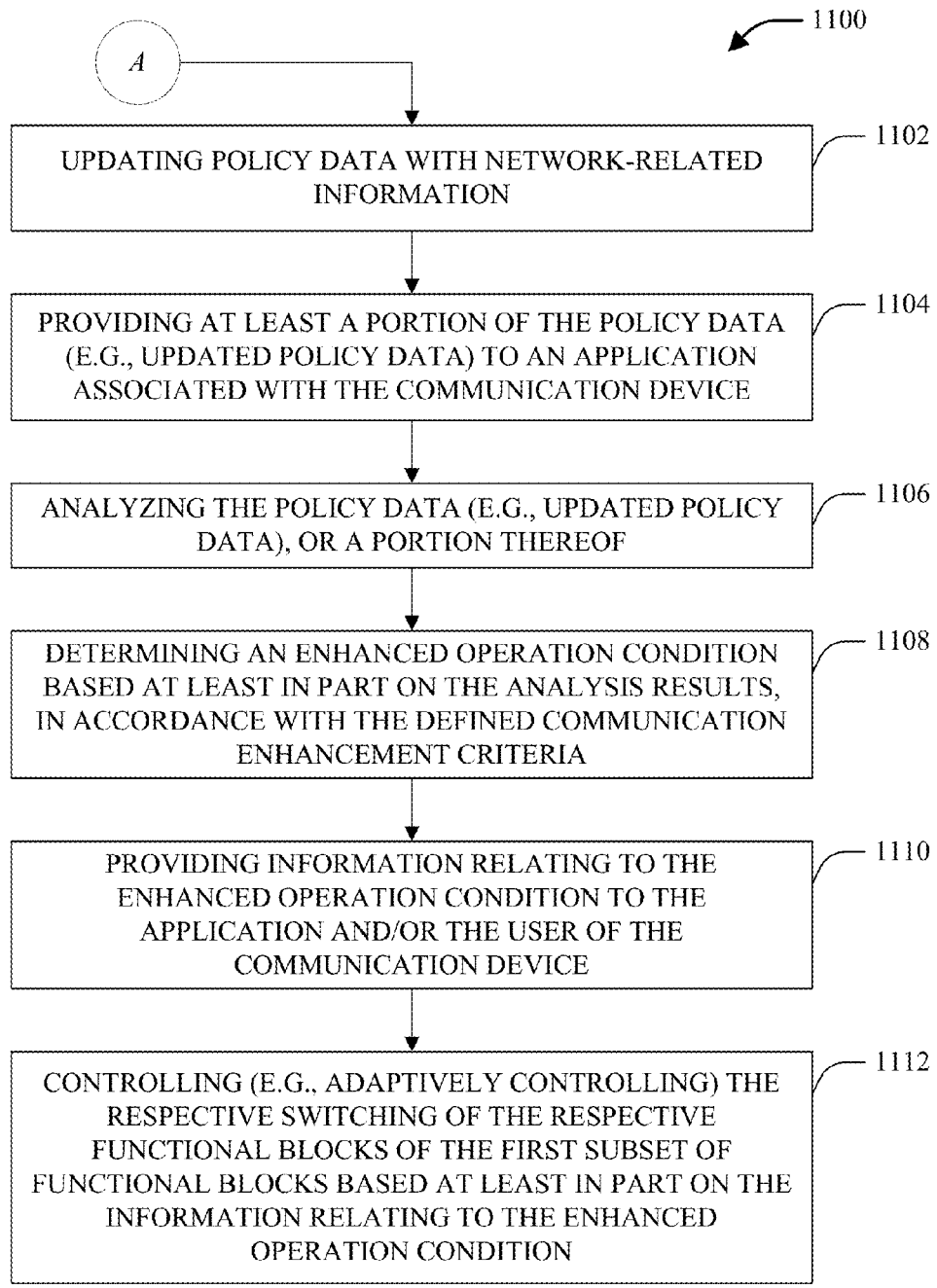
FIG. 11 is a flow diagram of another example method that can facilitate controlling (e.g., adaptively controlling) switching of functional blocks of a communication device in connection with an application used by the communication device in a communication network, in accordance with various aspects and embodiments.

In view of the example systems and/or devices described herein, example methods that can be implemented in accordance with the disclosed subject matter can be further appreciated with reference to flowcharts in FIGS. 9-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow chart of an example method 900 that can facilitate controlling (e.g., adaptively controlling) functional blocks used by applications that are used by communication devices (e.g., UEs) in a communication network, in accordance with various aspects and embodiments described herein. In accordance with various aspects, the method 900 can be utilized by, for example, a connection manager component and/or a kernel component.

At 902, activity, behavior, and/or traffic flows associated with a communication device and network-related conditions associated with the communication network can be monitored. The connection manager component can monitor or track the activity, behavior, and/or traffic flows (e.g., voice or data traffic flows) associated with the communication device and network-related conditions (e.g., network state information, network-related triggers, network-related controls, etc.) associated with the communication network.

At 904, the respective switching states of respective functional blocks of a subset of functional blocks associated with the kernel component (e.g., the dedicated kernel component) can be controlled (e.g., adaptively controlled) based at least in part on the results of an analysis of information relating to activity, behavior, and/or traffic flows associated with a communication device and network-related conditions associated with the communication network, in accordance with the defined communication enhancement criteria. The connection manager component can be associated with (e.g., interfaced with) the kernel component. The kernel component can be associated with the subset of functional blocks (e.g., functional blocks comprising baseband functions), wherein respective functional blocks can perform respective functions (e.g., data compression or decompression, data encryption or decryption, location detection, network-awareness functions (e.g., network-condition sensing, power level sensing, etc.), etc.) The kernel component and the subset of functional blocks can be partitioned or placed in a secure and trusted area of the communication device so that they cannot be visible to or accessed by certain applications (e.g., $3^{rd}$-party applications or other unauthorized applications) or other unauthorized entities (e.g., unauthorized and/or $3^{rd}$-party communication service providers) to facilitate securing the kernel component and the subset of functional blocks from being attacked, destroyed, or taken over by the certain applications or other unauthorized entities.

The communication device also can comprise a second subset of functional blocks that can be associated with the OS kernel component (e.g., rich OS kernel component). The connection manager component, OS kernel component, and the second subset of functional blocks can be located in the open area of the communication device that is outside of the secure and trusted area (e.g., zone) of the communication device. In some implementations, the open area of the communication device also can have a desired level of security, wherein such desired level of security can be different from the security level of the secure and trusted area of the communication device.

The connection manager component can analyze or evaluate the activity, behavior, and/or traffic flows associated with a communication device and the network-related conditions associated with the communication network, and can generate analysis results based at least in part on such analysis. As part of the analysis or evaluation, the connection manager component can access and apply policy information (e.g., communication enhancement policy information), for example, obtained from a policy database (e.g., stored in a data store). The policy information can be based at least in part on the defined communication enhancement criteria (e.g., which can be in accordance with desired optimization practices).

The connection manager component can control the respective switching states of the respective functional blocks of the subset of functional blocks associated with the kernel component based at least in part on the analysis results, in accordance with the defined communication enhancement criteria. In some implementations, based at least in part on the analysis results, the connection manager component can generate control instructions or switching recommendations that can facilitate desirably switching on or off respective functional blocks of the subset of functional blocks to facilitate enhancing (e.g., optimizing, acceptably improving or augmenting, etc.) operation of the communication device and/or the communication network. The connection manager component can communicate the control instructions or switching recommendations to the subset of functional blocks, or a portion thereof, via the kernel component to facilitate controlling the respective switching states of the respective functional blocks of the subset of functional blocks.

Referring next to FIG. 10, depicted is a flow chart of an example method 1000 that can provide information regarding functional blocks of a communication device to facilitate controlling (e.g., adaptively controlling) functional blocks used by applications that are used by the communication device (e.g., UE) in a communication network, in accordance with various aspects and embodiments. In accordance with various aspects, the method 1000 can be utilized by, for example, a connection manager component and/or a kernel component. In some implementations, one or more operations of the method 1000 can be initiated or performed automatically (e.g., by the connection manager component) or in response to an occurrence of a triggering condition (e.g., the user initiated an application or triggered an operation, the application triggered an operation, etc.).

At 1002, a set of functional blocks, comprising a first subset of functional blocks, of the communication device can be identified. The connection manager component can identify or determine the set of functional blocks of the communication device. Respective functional blocks of the set of functional blocks can comprise or perform respective functions (e.g., baseband functions), as more fully disclosed herein. The first subset of the functional blocks, and the kernel component, can reside in a partitioned area of the communication device. The partitioned area can be a secure and trusted area of the communication device, wherein the first subset of the functional blocks, and the kernel component, can remain invisible to, and access to the first subset of the functional blocks and the kernel component can be prohibited to, certain applications (e.g., $3^{rd}$-party applications or other unauthorized applications) or other unauthorized entities (e.g., unauthorized and/or $3^{rd}$-party communication service providers) to facilitate securing the kernel component and the first subset of functional blocks from being attacked, destroyed, or taken over by the certain applications or other unauthorized entities. The set of functional blocks also can comprise a second subset of functional blocks that can reside in an open area of the communication device, wherein the second subset of functional blocks can be accessed by the OS kernel component, for example.

At 1004, information relating to (e.g., identifying) the first subset of functional blocks can be provided (e.g., exposed, presented, etc.) to one or more applications associated with the communication device. The connection manager component can provide the information relating to the first subset of functional blocks to the one or more applications to facilitate notifying the one or more applications of the availability of the first subset of functional blocks on the communication device.

At 1006, selection information can be received from an application. The connection manager component can receive the selection information, which can facilitate selection of a functional block(s) of the first subset of functional blocks, from an application of the one or more applications.

At 1008, one or more functional blocks of the first subset of functional blocks can be initialized (e.g., switched on) based at least in part on (e.g., in response to) the selection information, in accordance with the defined communication enhancement criteria. The connection manager component can facilitate switching on the one or more functional blocks of the first subset of functional blocks based at least in part on the selection information, in accordance with the defined communication enhancement criteria.

At 1010, a communication connection between the application (and communication device) and the communication network can be established. The connection manager component can facilitate establishing the communication connection between the application (and communication device) and the communication network to facilitate initiating a communication session associated with the application, wherein the application can use the one or more functional blocks of the first subset of functional blocks during the communication session. The communication connection can be a 3G, 4G, or wi-fi communication connection, for example. At this point, the method 900 can proceed to reference point A, wherein, for example, proceeding from reference point A, a method 1100 can facilitate controlling switching of functional blocks, as more fully disclosed herein.

Turning to FIG. 11, illustrated is a flow chart of an example method 1100 that can facilitate controlling (e.g., adaptively controlling) switching of functional blocks of a communication device in connection with an application used by the communication device in a communication network, in accordance with various aspects and embodiments. In accordance with various aspects, the method 1100 can be utilized by, for example, a connection manager component and/or a kernel component. In some implementations, the method 1100 can proceed from reference point A (of the method 1000).

At 1102, policy data can be updated with network-related information. The connection manager component can update policy data (e.g., stored in a policy table or database in a data store) with network-related information received or detected from the communication network. The network-related information can comprise, for example, information relating to network-related communication conditions (e.g., network congestion level), network state information (e.g., network state change information), network-related triggers, and/or network-related controls, etc., associated with the communication network.

At 1104, at least a portion of the policy data (e.g., updated policy data) can be provided (e.g., exposed, presented, etc.) to an application associated with the communication device. The connection manager component can provide at least a portion of the policy data (e.g., updated policy data) to one or more applications associated with (e.g., utilized by) the communication device.

At 1106, the policy data (e.g., updated policy data), or a portion thereof, can be analyzed. The connection manager component, and/or the application and/or the kernel component, can analyze the policy data, or a portion thereof, to facilitate determining whether a functional block(s) of the first subset of functional blocks is to be switched on or switched off.

At 1108, an enhanced operation condition can be determined based at least in part on the analysis results, in accordance with the defined communication enhancement criteria. Based at least in part on the results of the analysis at 1006, the connection manager component, and/or the application and/or the kernel component, can determine the enhanced operation condition in accordance with the defined communication enhancement criteria (e.g., in accordance with desired optimization practices). The enhanced operation condition can be associated with (e.g., mapped to) the switching on or switching off of respective functional blocks of the first subset of functional blocks.

At 1110, information relating to the enhanced operation condition can be provided (e.g., exposed, presented, communicated, etc.) to the application and/or the user of the communication device. The connection manager component (and/or the kernel component) can provide the information relating to the enhanced operation condition to the application and/or the user via the user's communication device to facilitate controlling the switching on or switching off of the respective functional blocks of the first subset of functional blocks.

At 1112, the respective switching of the respective functional blocks of the first subset of functional blocks can be controlled (e.g., adaptively controlled) based at least in part on the information relating to the enhanced operation condition. The connection manager component can facilitate controlling the respective switching of the respective functional blocks of the first subset of functional blocks based at least in part on the information relating to the enhanced operation condition. Based at least in part on (e.g., in response to receiving) the information relating to the enhanced operation condition, the kernel component and/or the respective functional blocks, can facilitate respectively switching on or off the respective functional blocks of the first subset of functional blocks to facilitate desired operation of the communication device, including the respective functional blocks, and the communication network (e.g., in accordance with desired optimization practices).

At 1114, update information relating to the enhanced operation condition can be provided (e.g., presented, communicated, etc.) to the communication network to facilitate notifying the communication network that the communication device is operating in accordance with the enhanced operation condition. The connection manager component can provide the update information relating to the enhanced operation condition to the communication network (e.g., the base station, another component of the communication network via the base station). The communication network can use this information to facilitate implementing a desired network operational modification, if any, based at least in part on the enhanced operation condition employed by the communication device, including the respective functional blocks of the first subset of functional blocks, to facilitate desired operation of the communication network, in accordance with the defined communication enhancement criteria (e.g., in accordance with desired optimization practices).

Figure 12:
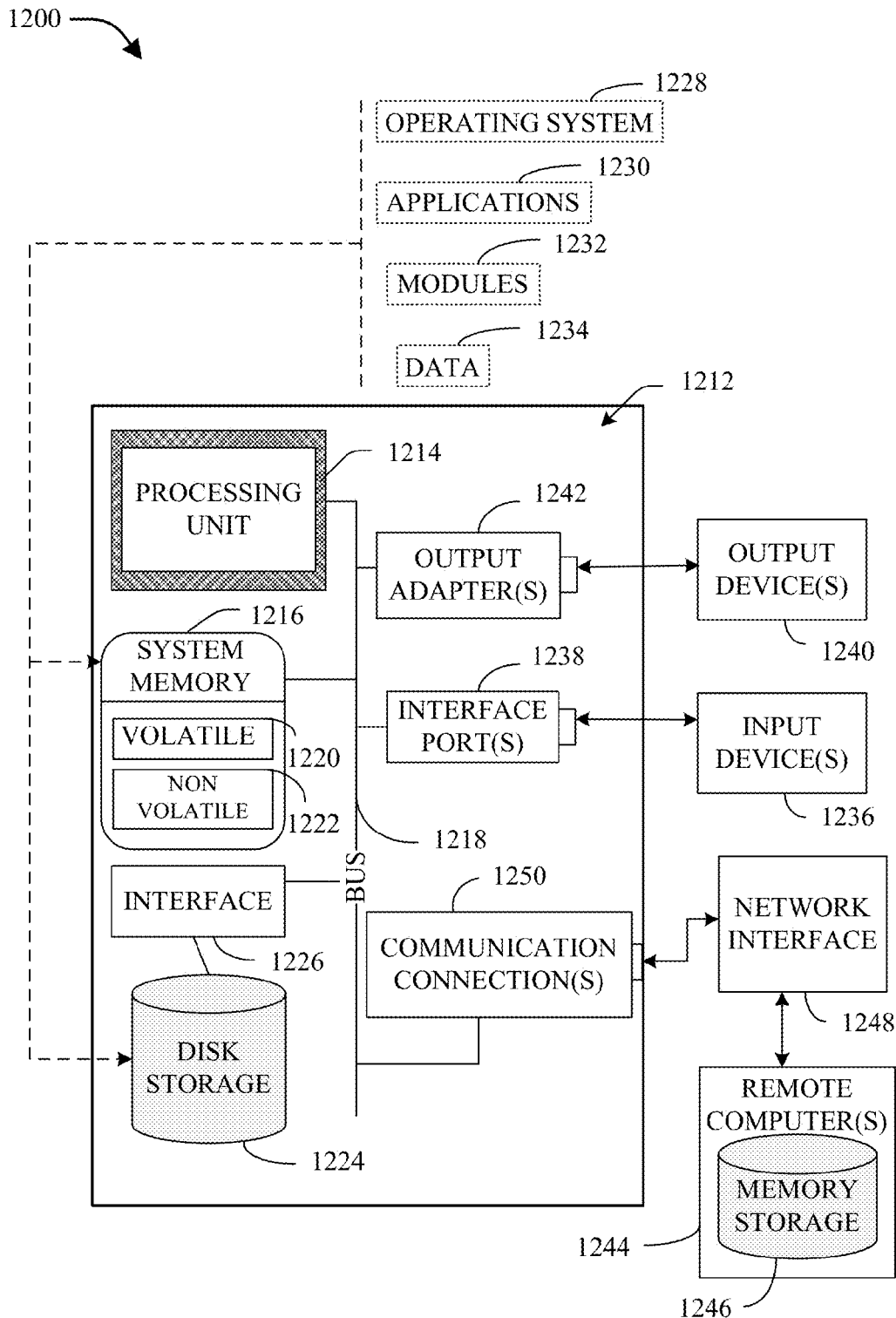
FIG. 12 is a schematic block diagram illustrating a suitable operating environment.
Figure 13:
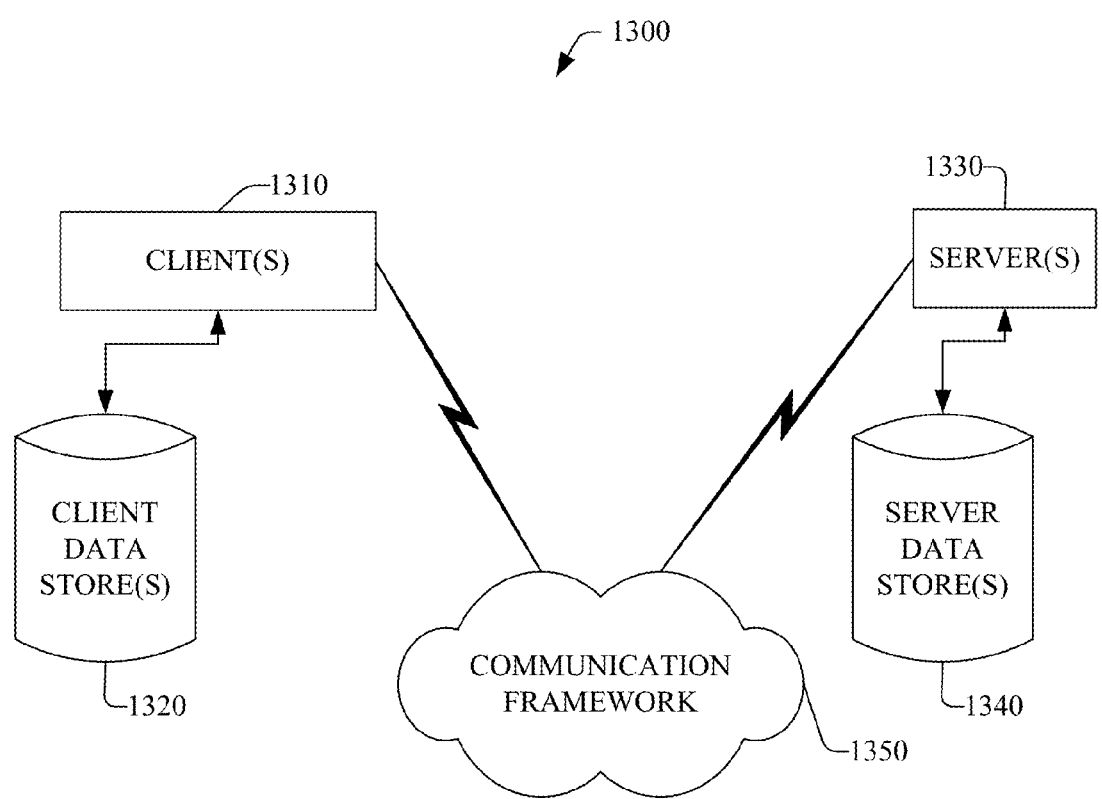
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 12, a suitable environment 1200 for implementing various aspects of this disclosure includes a computer 1212. The computer 1212 includes a processing unit 1214, a system memory 1216, and a system bus 1218. It is to be appreciated that the computer 1212 can be used in connection with implementing one or more of the systems or components shown and described in connection with FIGS. 1-8, or otherwise described herein. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored, e.g., in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 (e.g., computing system) with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects, features, and/or advantages of the disclosed subject matter can be exploited in substantially any wireless telecommunication or radio technology, e.g., wi-fi; bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, connection manager component, kernel component, resource manager component, functional block, processor component, data store, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    monitoring, by a system comprising a processor, traffic flow associated with a device and a network-related condition associated with a communication network;
    controlling, by the system, respective operational states of a first functional block associated with a kernel, wherein the controlling is based on a result of an analysis of information relating to the traffic flow and the network-related condition, and wherein the kernel and the first functional block are partitioned in a trusted area of the communication device that is associated with a defined level of trust; and
    in response to an application associated with the device being determined to be operating in an enhanced operation condition, transmitting, by the system, a notification that the application is operating under the enhanced operation condition to a network device of the communication network to notify the network device that the application is operating under the enhanced operation condition, wherein, in connection with use of the first functional block by the application, the enhanced operation condition relates to a first operational state of the first functional block that is determined to provide a more acceptable performance than a second operational state of the first functional block, in accordance with a defined communication enhancement criterion.

2. The method of claim 1, wherein a second functional block is associated with an operating-system kernel, and the trusted area and the first functional block are not accessible by the operating-system kernel.

3. The method of claim 1, further comprising:
    determining, by the system, functional blocks;
    determining, by the system, the first functional block from the functional blocks; and
    presenting, by the system, other information relating to the first functional block to the application associated with the device.

4. The method of claim 3, further comprising:
    receiving, by the system, selection information from the application;
    initializing, by the system, the first functional block based on the selection information, in accordance with the defined communication enhancement criterion; and
    establishing, by the system, a communication connection between the application and the network device of the communication network to facilitate communicating traffic based on operation of the first functional block.

5. The method of claim 4, further comprising:
    updating, by the system, policy data to generate updated policy data based on network-related information associated with the communication network;
    presenting, by the system, a portion of the updated policy data to the application;
    analyzing, by the system, the portion of the updated policy data;
    determining, by the system, the enhanced operation condition based on a result of the analyzing of the portion of the updated policy data, wherein the enhanced operation condition satisfies the defined communication enhancement criterion; and
    presenting, by the system, operation information relating to the enhanced operation condition to the application, wherein the respective operational states of the first functional block are controlled based on the operation information relating to the enhanced operation condition.

6. The method of claim 5, further comprising:
    in connection with the notification, presenting, by the system, updated operational information relating to the enhanced operation condition to the network device to facilitate notifying the network device that the device is operating in accordance with the enhanced operation condition.

7. The method of claim 1, further comprising:
    changing, by the system, an operational state of the first functional block in response to a change in the network-related condition associated with the communication network.

8. The method of claim 1, further comprising:
    receiving, by the system, a request to change an operational state of the first functional block from the application associated with the device;
    determining, by the system, whether the application is an authorized entity based on an authentication credential received from the application; and
    changing, by the system, the operational state of the first functional block in response to determining that the application is the authorized entity.

9. The method of claim 1, further comprising:
    initializing, by the system, an interface that facilitates detecting the network-related condition;
    receiving, by the system, a subset of the information relating to the network-related condition from a sensor associated with the interface; and
    determining, by the system, the enhanced operation condition based on a result of analyzing the subset of the information relating to the network-related condition, wherein the enhanced operation condition satisfies the defined communication enhancement criterion.

10. The method of claim 1, further comprising:
    receiving, by the system, a congestion-related notification that a defined threshold network congestion level is satisfied; and in response to the congestion-related notification, changing, by the system, an operational state of the first functional block to facilitate mitigating network congestion in the communication network, wherein the operational state is changed from an on state to an off state.

11. A system, comprising:
a processor; and
a memory that stores executable instructions that, when executed by the processor, facilitate performance of operations, comprising:
 tracking traffic flow associated with a device and a network-related condition associated with a communication network;
 based on a result of an analysis of information relating to the traffic flow and the network-related condition, controlling respective operational states of a first functional block associated with a kernel, wherein the kernel and the first functional block are partitioned in a trusted area of the device that is associated with a defined level of trust; and
 in response to an application associated with the device operating in an enhanced operation condition, communicating a notification that the application is operating under the enhanced operation condition to a network device of the communication network to notify the network device that the application is operating under the enhanced operation condition, wherein, with regard to use of the first functional block by the application, the enhanced operation condition relates to a first operational state of the first functional block that is determined to provide a more favorable performance than a second operational state of the first functional block, in accordance with a defined communication enhancement criterion.

12. The system of claim 11, wherein an operating-system kernel is associated with a second functional block, and wherein the trusted area and the first functional block are not accessible by the operating-system kernel.

13. The system of claim 11, wherein the operations further comprise:
 determining functional blocks;
 determining the first functional block from the functional blocks; and
 presenting other information relating to the first functional block to the application associated with the device.

14. The system of claim 13, wherein the operations further comprise:
 receiving selection information from the application, wherein the selection information facilitates selection of the first functional block;
 initializing the first functional block in response to the receiving the selection information, in accordance with the defined communication enhancement criterion; and
 establishing a communication connection between the application and the network device of the communication network to facilitate communication of traffic based on operation of the first functional block.

15. The system of claim 14, wherein the operations further comprise:
 updating policy data to generate updated policy data based on network-related information associated with the communication network;
 presenting a portion of the updated policy data to the application;
 analyzing the portion of the updated policy data;
 determining the enhanced operation condition based on a result of the analyzing of the portion of the updated policy data, wherein the enhanced operation condition is in accordance with the defined communication enhancement criterion; and
 presenting, by the system, operation condition information relating to the enhanced operation condition to the application, wherein the respective operational states of the first functional block are controlled based on the operation condition information relating to the enhanced operation condition.

16. The system of claim 15, wherein the operations further comprise:
 in connection with the notification, communicating updated operational information relating to the enhanced operation condition to the network device to facilitate notifying the network device that the device is operating in accordance with the enhanced operation condition.

17. The system of claim 11, wherein the operations further comprise:
 initializing an application programming interface that facilitates detecting the network-related condition;
 receiving a subset of the information relating to the network-related conditions from a sensor associated with the application programming interface; and
 determining the enhanced operation condition based on a result of analyzing the subset of the information relating to the network-related condition, wherein the enhanced operation condition is determined to satisfy the defined communication enhancement criterion.

18. A machine-readable storage device comprising executable instructions that, when executed by a processor, facilitate performance of operations, comprising:
 monitoring traffic flow associated with user equipment and network-related condition associated with a communication network;
 controlling respective operational states of a first functional block associated with a kernel based on a result of an analysis of information relating to the traffic flow and the network-related condition, wherein the kernel and the first of functional block are partitioned in a trusted area of the user equipment that is associated with a defined level of trust; and
 in response to an application associated with the user equipment operating in an enhanced operation condition, presenting a notification message that the application is operating under the enhanced operation condition to a network device of the communication network to notify the network device that the application is operating under the enhanced operation condition, wherein, in connection with use of the first functional block by the application, the enhanced operation condition relates to a first operational state of the first functional block that is determined to provide a more acceptable performance than a second operational state of the first functional block, in accordance with a defined communication enhancement criterion.

19. The machine-readable storage device of claim 18, wherein an operating-system kernel is associated with a second functional block, and wherein the trusted area and the first functional block are not accessible by the operating-system kernel.

20. The machine-readable storage medium of claim 18, wherein the operations further comprise:

modifying an operational state of the first functional block in response to a change in the network-related condition associated with the communication network.

* * * * *